(12) United States Patent
Imamura

(10) Patent No.: US 8,737,793 B2
(45) Date of Patent: May 27, 2014

(54) MULTI-CORE OPTICAL FIBER AND METHOD OF MANUFACTURING THE SAME

(71) Applicant: Furukawa Electric Co., Ltd., Tokyo (JP)

(72) Inventor: Katsunori Imamura, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/786,029

(22) Filed: Mar. 5, 2013

(65) Prior Publication Data

US 2013/0183016 A1 Jul. 18, 2013

Related U.S. Application Data

(63) Continuation-in-part of application No. 13/360,853, filed on Jan. 30, 2012, which is a continuation of application No. PCT/JP2011/052381, filed on Feb. 4, 2011.

(60) Provisional application No. 61/606,744, filed on Mar. 5, 2012, provisional application No. 61/648,889, filed on May 18, 2012.

(30) Foreign Application Priority Data

Mar. 16, 2010 (JP) ................................ 2010-059960

(51) Int. Cl.
   *G02B 6/036* (2006.01)
   *G02B 6/02* (2006.01)
   *C03B 37/012* (2006.01)

(52) U.S. Cl.
   CPC .......... *G02B 6/02042* (2013.01); *G02B 6/0365* (2013.01); *C03B 37/01222* (2013.01)
   USPC ....................................................... 385/126

(58) Field of Classification Search
   CPC ................................................... G02B 6/02042
   USPC ........................................................... 385/126
   See application file for complete search history.

(56) References Cited

U.S. PATENT DOCUMENTS 7,492,999 B2    2/2009   Imamura
7,609,928 B2    10/2009  Imamura
(Continued)

FOREIGN PATENT DOCUMENTS

WO    WO 2004/092794 A1    10/2004

OTHER PUBLICATIONS

Kunimasa Saitoh, et al. "Multi-Core Hole-Assisted Fibers for High Core Density Space Division Multiplexing," 2010 Nen The Institute of Electronics, Information and Communication Engineers Sogo Taikai Koen Ronbunshu, Mar. 2, 2010, p. 523, (with English translation).

(Continued)

*Primary Examiner* — Hemang Sanghavi
(74) *Attorney, Agent, or Firm* — Oblon, Spivak, McClelland, Maier & Neustadt, L.L.P.

(57) ABSTRACT

A multi-core optical fiber includes: a plurality of core portions; and a cladding portion positioned so as to surround each of the core portions, wherein each core portion includes a center core portion that has a refractive index greater than that of the cladding portion, a second core portion that is formed so as to surround the center core portion and that has a refractive index less than that of the center core portion, and a depressed portion that is formed so as to surround the second core portion and that has a refractive index less than those of the second core portion and the cladding portion, and an interval distance between the adjacent core portions is set such that optical cross-talk between the core portions for a total length of the multi-core optical fiber is equal to or less than −30 dB at a wavelength of 1.55 μm.

7 Claims, 29 Drawing Sheets

(56) References Cited

U.S. PATENT DOCUMENTS

| | | | |
|---|---|---|---|
| 7,613,374 | B2 | 11/2009 | Imamura |
| 7,657,141 | B2 | 2/2010 | Imamura |
| 7,693,379 | B2 | 4/2010 | Imamura |
| 7,742,671 | B2 | 6/2010 | Koyamada et al. |
| 7,773,845 | B2 | 8/2010 | Imamura |
| 8,041,173 | B2 | 10/2011 | Imamura |
| 8,094,985 | B2 | 1/2012 | Imamura |
| 8,406,595 | B2 * | 3/2013 | Hayashi ............... 385/126 |
| 2002/0176677 | A1 * | 11/2002 | Kumar et al. .......... 385/126 |
| 2006/0039665 | A1 | 2/2006 | Matsuo et al. |
| 2008/0219667 | A1 | 9/2008 | Imamura |
| 2009/0324242 | A1 | 12/2009 | Imamura |
| 2010/0150507 | A1 | 6/2010 | Takahashi et al. |
| 2010/0290750 | A1 | 11/2010 | Imamura |
| 2011/0026890 | A1 | 2/2011 | Takahashi et al. |
| 2011/0091176 | A1 | 4/2011 | Takahashi et al. |
| 2011/0176776 | A1 | 7/2011 | Imamura |
| 2011/0206331 | A1 | 8/2011 | Imamura |
| 2011/0274398 | A1 * | 11/2011 | Fini et al. ............... 385/124 |
| 2012/0008908 | A1 | 1/2012 | Imamura |
| 2012/0183304 | A1 * | 7/2012 | Winzer et al. ......... 398/142 |
| 2013/0039627 | A1 * | 2/2013 | Li et al. ................. 385/126 |

OTHER PUBLICATIONS

Kuniharu Himeno, et al. "Low-Bending-Loss Single-Mode Fibers for Fiber-to-the-Home," Journal of Lightwave Technology, vol. 23, No. 11, Nov. 2005, pp. 3494-3499.

Jian Zhou, et al., "Application of PCF to Optical Fiber Wiring in Residential and Business Premises," The Institute of Electronics, Information and Communication Engineers, vol. 102, No. 581, pp. 41-46, Jan. 16, 2003 (with English abstract).

K. Takenaga, et al., "Reduction of Crosstalk by Quasi-Homogeneous Solid Multi-Core Fiber," 2010 Nen The Institute of Electronics, Information and Communication Engineers Sogo Taikai Koen Ronbunshu, Mar. 2, 2010, p. 357, (with English Translation).

Masanori Koshiba, et al., "Heterogeneous multi-core fibers: proposal and design principle," IEICE Electronics Express, vol. 6, No. 2, pp. 98-103, Jan. 25, 2009.

Marianne Bigot-Astruc, et al., "Trench-Assisted Profiles for Large-Effective-Area Single-Mode Fibers," ECOC 2008, vol. 1-73, Mo.4.B.1, Sep. 21-25, 2008.

* cited by examiner

| Δ1 | Δ2 | Δ3 | 2A | Ra2 | Ra3 | Ra3-Ra2 |
|---|---|---|---|---|---|---|
| 0.287 % | 0 % | -0.35 % | 9.8 μm | 2 | 3.05 | 1.05 |

FIG.19

| REFERENTIAL EXAMPLE | | 1 | 2 | 3 |
|---|---|---|---|---|
| $\lambda cc$ | nm | 1255 | 1339 | 1441 |
| Aeff | $\mu m^2$ | 90.3 | 96.3 | 103.6 |
| MFD | $\mu m$ | 10.8 | 11.1 | 11.4 |
| BENDING LOSS | dB/m | 1.9 | 0.4 | 0.4 |
| TRANSMISSION LOSS | dB/km | 0.188 | 0.189 | 0.199 |
| WAVELENGTH DISPERSION | ps/nm/km | 19.8 | 19.9 | 20.2 |
| DISPERSION SLOPE | ps/nm²/km | 0.064 | 0.064 | 0.064 |

FIG.20

| REFERENTIAL EXAMPLE | | 1 | 2 | 3 |
|---|---|---|---|---|
| THICKNESS OF CLADDING PORTION | $\mu m$ | 58.5 | 62.5 | 66.5 |
| OUTSIDE DIAMETER OF CLADDING PORTION | $\mu m$ | 117.0 | 125.0 | 133.0 |

FIG.21

| EMBODIMENT EXAMPLE 1 | | A | B | C | D | E | F | G |
|---|---|---|---|---|---|---|---|---|
| λcc | nm | 1359 | 1284 | 1222 | 1270 | 1212 | 1278 | 1212 |
| Aeff | μm² | 98.5 | 94.4 | - | 93.0 | - | - | 89.3 |
| MFD | μm | 11.2 | 10.9 | - | 10.9 | - | - | 10.6 |
| BENDING LOSS | dB/m | 0.4 | 1.0 | - | 1.0 | - | - | 1.7 |
| TRANSMISSION LOSS | dB/km | 0.215 | 0.254 | - | 0.262 | - | - | 0.290 |
| WAVELENGTH DISPERSION | ps/nm/km | 20.1 | 19.9 | - | 19.7 | - | - | 19.7 |
| DISPERSION SLOPE | ps/nm²/km | 0.064 | 0.064 | - | 0.064 | - | - | 0.064 |
| EMBODIMENT EXAMPLE 2 | | A | B | C | D | E | F | G |
| λcc | nm | 1414 | 1338 | 1247 | 1308 | 1255 | 1315 | 1259 |
| Aeff | μm² | 101.9 | 96.8 | - | - | - | - | 92.3 |
| MFD | μm | 11.4 | 11.1 | - | - | - | - | 10.8 |
| BENDING LOSS | dB/m | 0.2 | 0.6 | - | - | - | - | 0.9 |
| TRANSMISSION LOSS | dB/km | 0.202 | 0.233 | - | - | - | - | 0.278 |
| WAVELENGTH DISPERSION | ps/nm/km | 20.2 | 20.0 | - | - | - | - | 19.8 |
| DISPERSION SLOPE | ps/nm²/km | 0.064 | 0.064 | - | - | - | - | 0.064 |
| EMBODIMENT EXAMPLE 3 | | A | B | C | D | E | F | G |
| λcc | nm | 1281 | 1266 | 1292 | 1266 | 1257 | 1265 | 1330 |
| Aeff | μm² | 93.8 | - | - | - | 91.6 | 91.8 | 95.9 |
| MFD | μm | 10.9 | - | - | - | 10.8 | 10.8 | 11.0 |
| BENDING LOSS | dB/m | 0.9 | - | - | - | 1.4 | 1.0 | 0.9 |
| TRANSMISSION LOSS | dB/km | 0.562 | - | - | - | 0.551 | 0.565 | 0.574 |
| WAVELENGTH DISPERSION | ps/nm/km | 19.9 | - | - | - | 19.8 | 19.8 | 19.8 |
| DISPERSION SLOPE | ps/nm²/km | 0.064 | - | - | - | 0.064 | 0.064 | 0.063 |
| EMBODIMENT EXAMPLE 4 | | A | B | C | D | E | F | G |
| λcc | nm | 1335 | 1314 | 1335 | 1331 | 1316 | 1311 | 1361 |
| Aeff | μm² | 96.4 | - | 96.4 | - | 94.4 | 95.0 | 99.1 |
| MFD | μm | 11.1 | - | 11.1 | - | 10.9 | 11.0 | 11.2 |
| BENDING LOSS | dB/m | 0.4 | - | 0.5 | - | 1.0 | 0.5 | 0.5 |
| TRANSMISSION LOSS | dB/km | 0.508 | - | 0.570 | - | 0.466 | 0.478 | 0.688 |
| WAVELENGTH DISPERSION | ps/nm/km | 20.0 | - | 19.9 | - | 19.9 | 19.9 | 19.9 |
| DISPERSION SLOPE | ps/nm²/km | 0.064 | - | 0.064 | - | 0.064 | 0.064 | 0.064 |
| COMPARATIVE EXAMPLE 1 | | A | B | C | D | E | F | G |
| λcc | nm | 1438 | 1395 | 1336 | 1399 | 1320 | 1405 | 1324 |
| Aeff | μm² | 92.1 | 89.8 | 88.4 | 90.3 | 87.1 | 90.4 | 87.8 |
| MFD | μm | 11.1 | 11.0 | 10.9 | 11.0 | 10.8 | 11.0 | 10.9 |
| BENDING LOSS | dB/m | 1.0 | 2.7 | 7.8 | 2.6 | 7.3 | 2.5 | 7.3 |
| TRANSMISSION LOSS | dB/km | 0.263 | 0.268 | 0.296 | 0.282 | 0.315 | 0.282 | 0.298 |
| WAVELENGTH DISPERSION | ps/nm/km | 18.9 | - | 17.9 | 18.4 | - | - | - |
| DISPERSION SLOPE | ps/nm²/km | 0.061 | - | 0.060 | 0.060 | - | - | - |

FIG.22

|  | | EMBODIMENT EXAMPLE 1 | EMBODIMENT EXAMPLE 2 | EMBODIMENT EXAMPLE 3 | EMBODIMENT EXAMPLE 4 | COMPARATIVE EXAMPLE 1 |
|---|---|---|---|---|---|---|
| INTERVAL DISTANCE | μm | 48.6 | 50.5 | 48.3 | 50.2 | 48.4 |
| THICKNESS OF CLADDING PORTION | μm | 71.3 | 74.2 | 70.3 | 73.0 | 70.8 |
| OUTSIDE DIAMETER OF CLADDING PORTION | μm | 239.8 | 249.5 | 237.1 | 246.5 | 238.4 |

FIG.31
| ITEM | Aeff | λcc | BENDING LOSS |
|---|---|---|---|
| UNIT | μm² | nm | dB/m |
| DESIGNED VALUE | 148.4 | 1440 | 0.17 |
FIG.32
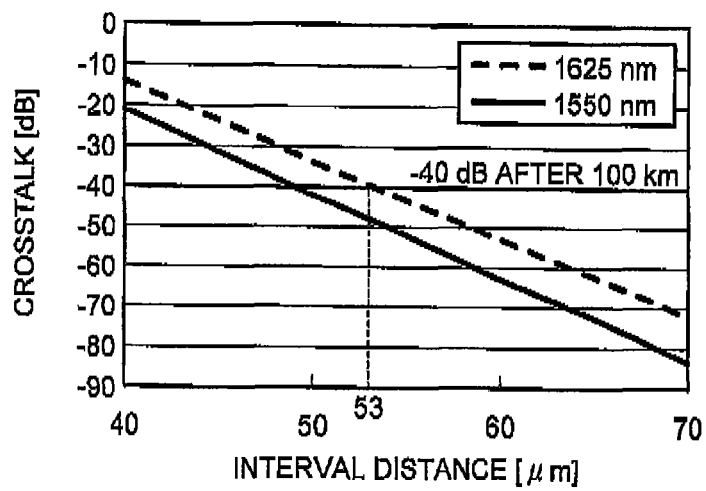
FIG.33
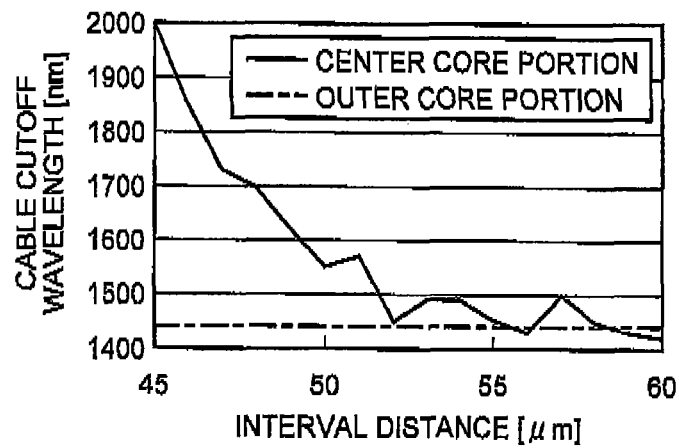

FIG.34
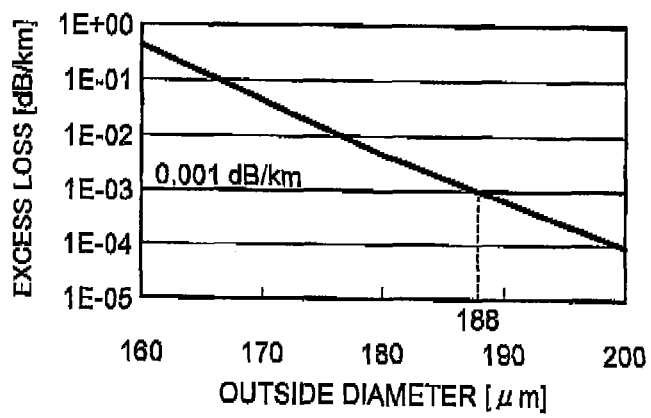
FIG.35
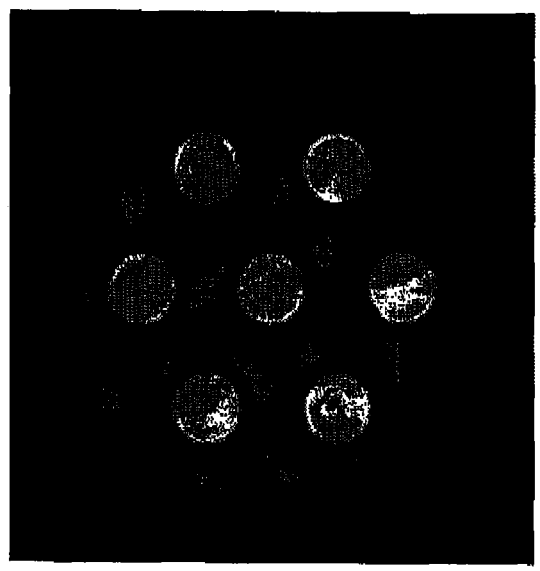
FIG.36
| ITEM | UNIT | VALUE |
|---|---|---|
| INTREVAL DISTANCE OF CORE PORTIONS | μm | 55 |
| OUTSIDE DIAMETER OF CLADDING PORTION | μm | 186 |
| OUTSIDE DIAMETER OF COATING PORTION | μm | 345 |

| ID NUMBER OF CORE PORTION | Aeff | λcc | TRANSMISSION LOSS | DISPERSION | DISPERSION SLOPE | PMD | BENDING LOSS |
|---|---|---|---|---|---|---|---|
| | 1550 nm | - | 1550 nm | 1550 nm | 1550 nm | 1550 nm | 1550 nm |
| | μm² | nm | dB/km | ps/nm/km | ps/nm²/km | ps/rkm | dB/m |
| 1 | 136.7 | 1478 | 0.552 | 20.9 | 0.062 | 0.1 | 0.08 |
| 2 | 145.8 | 1479 | 216 | 20.9 | 0.062 | 0.0 | 0.16 |
| 3 | 141.9 | 1488 | 0.204 | 21.1 | 0.062 | 0.0 | 0.18 |
| 4 | 143.2 | 1468 | 0.204 | 20.8 | 0.062 | 0.0 | 0.14 |
| 5 | 140.9 | 1467 | 0.229 | 20.8 | 0.062 | 0.0 | 0.13 |
| 6 | 136.8 | 1469 | 0.216 | 20.6 | 0.061 | 0.0 | 0.17 |
| 7 | 141.8 | 1480 | 0.242 | 20.7 | 0.061 | 0.06 | 0.18 |
| AVERAGE | 141.0 | 14 | 0.224 | 20.8 | 0.062 | 0.0 | 0.15 |

| PORTION | Δ | Ra2, Ra3 | DIAMETER |
|---|---|---|---|
| | % | - | μm |
| CENTER | 0.26 | - | 12.0 |
| SECOND | 0 | 2.0 | 24.0 |
| DEPRESSED | -0.7 | 2.6 | 31.2 |

| ITEM | ATTENU-ATION LOSS | λcc | Aeff | MFD | DISPERSION | DISPERSION SLOPE | PMD | BENDING LOSS (R=10 mm) |
|---|---|---|---|---|---|---|---|---|
| Unit | dB/km | nm | $\mu m^2$ | $\mu m$ | ps/nm/km | $ps/nm^2/km$ | ps/rkm | dB/m |
| Core 1 | 0.198 | 1407 | 121.1 | 12.4 | 20.6 | 0.064 | 0.0 | 0.5 |
| Core 2 | 0.199 | 1462 | 125.2 | 12.6 | 20.6 | 0.064 | 0.0 | 0.4 |
| Core 3 | 0.199 | 1426 | 119.5 | 12.2 | 20.6 | 0.064 | 0.0 | 0.5 |
| Core 4 | 0.198 | 1422 | 118.2 | 12.2 | 20.6 | 0.064 | 0.0 | 0.5 |
| Core 5 | 0.200 | 1425 | 121.7 | 12.4 | 20.6 | 0.064 | 0.0 | 0.4 |
| Core 6 | 0.197 | 1418 | 120.3 | 12.4 | 20.6 | 0.064 | 0.0 | 0.5 |
| Core 7 | 0.196 | 1433 | 117.5 | 12.2 | 20.6 | 0.064 | 0.0 | 0.5 |
| AVERAGE | 0.198 | 1428 | 120.5 | 12.3 | 20.6 | 0.064 | 0.0 | 0.5 |

| ITEM | UNIT | Core ID | | | | | | | AVERAGE |
|---|---|---|---|---|---|---|---|---|---|
| | | 1 | 2 | 3 | 4 | 5 | 6 | 7 | |
| SPAN LOSS | dB | 10.2 | 10.5 | 10.0 | 10.1 | 10.4 | 10.3 | 9.9 | 10.2 |

FIG.45

| ITEM | ATTENUATION LOSS | λcc | Aeff | DISPERSION | DISPERSION SLOPE | PMD | BENDING LOSS (R=5 mm) |
|---|---|---|---|---|---|---|---|
| UNIT | dB/km | nm | μm² | ps/nm/km | ps/nm²/km | ps/rkm | dB/turn |
| CORE 1 | 0.225 | 1459 | 71.8 | 19.7 | 0.062 | 0.08 | 0.5 |
| CORE 2 | 0.241 | 1528 | 74.7 | 19.8 | 0.062 | 0.05 | 0.4 |
| CORE 3 | 0.228 | 1454 | 72.0 | 19.5 | 0.063 | 0.07 | 0.5 |
| CORE 4 | 0.227 | 1443 | 71.1 | 19.5 | 0.063 | 0.08 | 0.5 |
| CORE 5 | 0.223 | 1461 | 72.6 | 19.6 | 0.063 | 0.07 | 0.4 |
| CORE 6 | 0.223 | 1469 | 73.0 | 19.5 | 0.063 | 0.06 | 0.4 |
| CORE 7 | 0.249 | 1425 | 70.4 | 19.6 | 0.063 | 0.06 | 0.5 |
| CORE 8 | 0.250 | 1343 | 70.8 | 19.5 | 0.063 | 0.06 | 0.4 |
| CORE 9 | 0.236 | 135 | 70.8 | 19.4 | 0.063 | 0.07 | 0.5 |
| CORE 10 | 0.226 | 1349 | 70.5 | 19.5 | 0.063 | 0.07 | 0.3 |
| CORE 11 | 0.215 | 1350 | 71.1 | 19.5 | 0.063 | 0.05 | 0.4 |
| CORE 12 | 0.214 | 1354 | 71.2 | 19.5 | 0.063 | 0.05 | 0.4 |
| CORE 13 | 0.212 | 1358 | 70.7 | 19.5 | 0.063 | 0.07 | 0.4 |
| CORE 14 | 0.207 | 1384 | 71.9 | 19.6 | 0.063 | 0.04 | 0.4 |
| CORE 15 | 0.209 | 1339 | 70.9 | 19.5 | 0.063 | 0.04 | 0.4 |
| CORE 16 | 0.213 | 1356 | 71.1 | 19.6 | 0.062 | 0.06 | 0.4 |
| CORE 17 | 0.233 | 1325 | 70.9 | 19.5 | 0.063 | 0.03 | 0.4 |
| CORE 18 | 0.238 | 1357 | 72.6 | 19.5 | 0.063 | 0.08 | 0.4 |
| CORE 19 | 0.251 | 1337 | 71.0 | 19.5 | 0.062 | 0.05 | 0.4 |
| CENTER | 0.225 | 1459 | 71.8 | 19.7 | 0.062 | 0.08 | 0.5 |
| INNER | 0.232 | 1463 | 72.3 | 19.6 | 0.063 | 0.06 | 0.4 |
| OUTER | 0.225 | 1350 | 71.1 | 19.5 | 0.063 | 0.06 | 0.4 |
| ALL | 0.227 | 1392 | 71.5 | 19.5 | 0.063 | 0.06 | 0.4 |

FIG.49

| ITEM | ATTENUATION LOSS | λcc | Aeff | DISPERSION | DISPERSION SLOPE | PMD | BENDING LOSS (R=5 mm) |
|---|---|---|---|---|---|---|---|
| UNIT | dB/km | nm | μm² | ps/nm/km | ps/nm²/km | ps/rkm | dB/turn |
| CORE 1 | 0.226 | 1525 | 74.1 | 19.9 | 0.063 | 0.10 | 0.4 |
| CORE 2 | 0.230 | 1499 | 73.5 | 19.8 | 0.063 | 0.03 | 0.3 |
| CORE 3 | 0.211 | 1518 | 74.2 | 19.7 | 0.063 | 0.10 | 0.3 |
| CORE 4 | 0.216 | 1489 | 73.8 | 19.7 | 0.063 | 0.07 | 0.3 |
| CORE 5 | 0.213 | 1532 | 74.8 | 19.8 | 0.063 | 0.08 | 0.3 |
| CORE 6 | 0.227 | 1535 | 75.6 | 19.8 | 0.063 | 0.09 | 0.3 |
| CORE 7 | 0.241 | 1488 | 73.0 | 19.7 | 0.063 | 0.07 | 0.3 |
| CORE 8 | 0.214 | 1408 | 74.9 | 19.7 | 0.063 | 0.07 | 0.2 |
| CORE 9 | 0.205 | 1403 | 73.1 | 19.7 | 0.063 | 0.10 | 0.2 |
| CORE 10 | 0.204 | 1411 | 73.4 | 19.7 | 0.062 | 0.06 | 0.2 |
| CORE 11 | 0.205 | 1411 | 73.7 | 19.7 | 0.063 | 0.03 | 0.2 |
| CORE 12 | 0.206 | 1418 | 73.7 | 19.7 | 0.063 | 0.05 | 0.2 |
| CORE 13 | 0.207 | 1417 | 73.5 | 19.7 | 0.063 | 0.03 | 0.3 |
| CORE 14 | 0.211 | 1412 | 73.2 | 19.7 | 0.063 | 0.07 | 0.3 |
| CORE 15 | 0.215 | 1414 | 73.5 | 19.7 | 0.063 | 0.08 | 0.3 |
| CORE 16 | 0.235 | 1425 | 73.7 | 19.8 | 0.063 | 0.07 | 0.3 |
| CORE 17 | 0.237 | 1370 | 73.3 | 19.7 | 0.062 | 0.06 | 0.3 |
| CORE 18 | 0.243 | 1452 | 76.4 | 19.9 | 0.063 | 0.05 | 0.2 |
| CORE 19 | 0.255 | 1398 | 72.9 | 19.6 | 0.063 | 0.06 | 0.3 |
| CENTER | 0.226 | 1525 | 74.1 | 19.9 | 0.063 | 0.10 | 0.4 |
| INNER | 0.223 | 1512 | 74.2 | 19.7 | 0.063 | 0.07 | 0.3 |
| OUTER | 0.220 | 1412 | 73.8 | 19.7 | 0.063 | 0.06 | 0.3 |
| ALL | 0.221 | 1449 | 73.9 | 19.7 | 0.063 | 0.07 | 0.3 |

FIG.52

|  | NUMBER OF CORE PORTIONS | OUTSIDE DIAMETER OF CLADDING PORTION | CORE DENSITY |
|---|---|---|---|
| SMF | 1 | 125 μm | 1 |
| 7-core | 7 | 150 μm | 4.9 |
| 10-core | 10 | 204.4 μm | 3.7 |
| EMBODIMENT EXAMPLE 6 | 19 | 200 μm | 7.4 |

FIG.53

|  | NUMBER OF CORE PORTIONS | OUTSIDE DIAMETER OF CLADDING PORTION | CORE DENSITY |
|---|---|---|---|
| SMF | 1 | 250 μm | 1 |
| 7-core | 7 | 256 μm | 6.7 |
| 10-core | 10 | 317 μm | 6.2 |
| EMBODIMENT EXAMPLE 6 | 19 | 345 μm | 10.0 |

MULTI-CORE OPTICAL FIBER AND METHOD OF MANUFACTURING THE SAME

CROSS-REFERENCE TO RELATED APPLICATIONS

This application is a continuation-in-part of U.S. application Ser. No. 13/360,853, filed on Jan. 30, 2012 which is a continuation of PCT International Application No. PCT/JP2011/052381 filed on Feb. 4, 2011 which claims the benefit of priority from Japanese Patent Application No. 2010-059960 filed on Mar. 16, 2010. This application claims the benefit of priority from provisional U.S. Patent Application Ser. Nos. 61/606,744 filed on Mar. 5, 2012 and 61/648,889 filed on May 18, 2012. The entire contents of the applications are incorporated herein by reference.

BACKGROUND OF THE INVENTION

1. Field of the Invention

The present invention relates to a multi-core optical fiber and a method of manufacturing the same.

2. Description of the Related Art

Multi-core optical fibers each having a plurality of core portions can be used in optical transmission paths that are required to have optical communication cables with densely packed optical fibers, and in optical interconnection systems that are required to have densely arranged wiring in devices. Similar to conventional optical fibers, some of the multi-core optical fibers include core portions whose refractive indices are different from each other, and confine light in the core portions due to the difference between the refractive indices of the core portions and a refractive index of the cladding portion (see, for example, M. Koshiba, et al., "Heterogeneous multi-core fibers: proposal and design principle", IEICE Electronics Express, vol. 6, no. 2, pp. 98-103 (2009); hereinafter referred to as "M. Koshiba, at al."). In a cross section perpendicular to a longitudinal direction of the multi-core optical fiber, the core portions are arranged separated from each other by a predetermined interval, and cross-talk between any pair of core portions becomes small so that the core portions can be closely packed.

To achieve a large effective core area (Aeff) of a single-mode optical fiber, an optical fiber has been proposed that has a trench-assisted refractive index profile (see, for example, M. B. Astruc, at al., "Trench-Assisted Profiles for Large-Effective-Area Single-Mode Fibers", ECOC 2008, MO.4.B.1 (2008)).

In accordance with further increases in the capacity of optical communications, there is demand for multi-core optical fibers that have core portions arranged more densely and that make it possible to suppress cross-talk between the core portions.

It is an object of the present invention to provide a multi-core optical fiber that has core portions arranged more densely and that makes it possible to suppress cross-talk between the core portions, and to provide a method of manufacturing the multi-core optical fiber.

SUMMARY OF THE INVENTION

According to one aspect of the present invention, there is provided a multi-core optical fiber including: a plurality of core portions; and a cladding portion positioned so as to surround an outside of each of the core portions, wherein each of the core portions includes a center core portion that is positioned at a center of each core portion and that has a refractive index which is greater than that of the cladding portion, a second core portion that is formed so as to surround an outside of the center core portion and that has a refractive index which is less than that of the center core portion, and a depressed portion that is formed so as to surround an outside of the second core portion and that has a refractive index which is less than those of the second core portion and the cladding portion, and an interval distance between each of the core portions and another one of the core portions positioned adjacent thereto is set such that optical cross-talk between the core portions for a total length of the multi-core optical fiber is equal to or less than −30 dB at a wavelength of 1.55 μm.

According to another aspect of the present invention, there is provided a method of manufacturing the multi-core optical fiber, the method including: arranging capillaries inside a glass member that is used to form the cladding portion, thereby forming an optical fiber preform, each of the capillaries having a core area that is used to form each of the center core portion and the second core portion, and a depressed area that is used to form the depressed portion; and drawing the optical fiber from the optical fiber preform.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a table of measurement results of characteristics of single-core optical fibers of Referential examples 1 to 3.

FIG. 20 is a table of a thickness of a cladding portion and an outside diameter of the cladding portion of each of the single-core optical fibers of Referential examples 1 to 3.

FIG. 21 is a table of measurement results of characteristics of each core portion of the multi-core optical fibers of Embodiment examples 1 to 4 and Comparative example 1.

FIG. 22 is a table of an interval distance between core portions, a thickness of a cladding portion, and an outside diameter of the cladding portion of each of the multi-core optical fibers of Embodiment examples 1 to 4 and Comparative example 1.

FIG. 31 is a table of designed optical properties

FIG. 32 is a graph that depicts the calculated relation between interval distance between the cores and crosstalk after 100 km transmission.

FIG. 33 is a graph that depicts the simulated relation between interval distance between the cores and cable cut-off wavelength for the center core portion and outer core portions.

FIG. 34 is a graph that depicts the relation between outside diameter of the cladding portion and excess loss of outer core portions.

FIG. 35 is a cross-sectional view of the multi-core optical fiber of Embodiment example 5A.

FIG. 36 is a table of structural parameters of the multi-core optical fiber of Embodiment example 5A.

FIG. 45 is a table of the optical characteristics of all core portions in the multi-core optical fiber of Embodiment Example 6.

FIG. 49 is a table of the optical characteristics of all core portions in the multi-core optical fiber of Embodiment Example 7.

FIG. 52 is a table of the number of core portions, outside diameter of cladding portion, and core density based on the outside diameter of the cladding portion.

FIG. 53 is a table of the number of core portions, outside diameter of cladding portion, and core density based on the outside diameter of the coating portion.

DETAILED DESCRIPTION OF THE PREFERRED EMBODIMENTS

Figure 1:
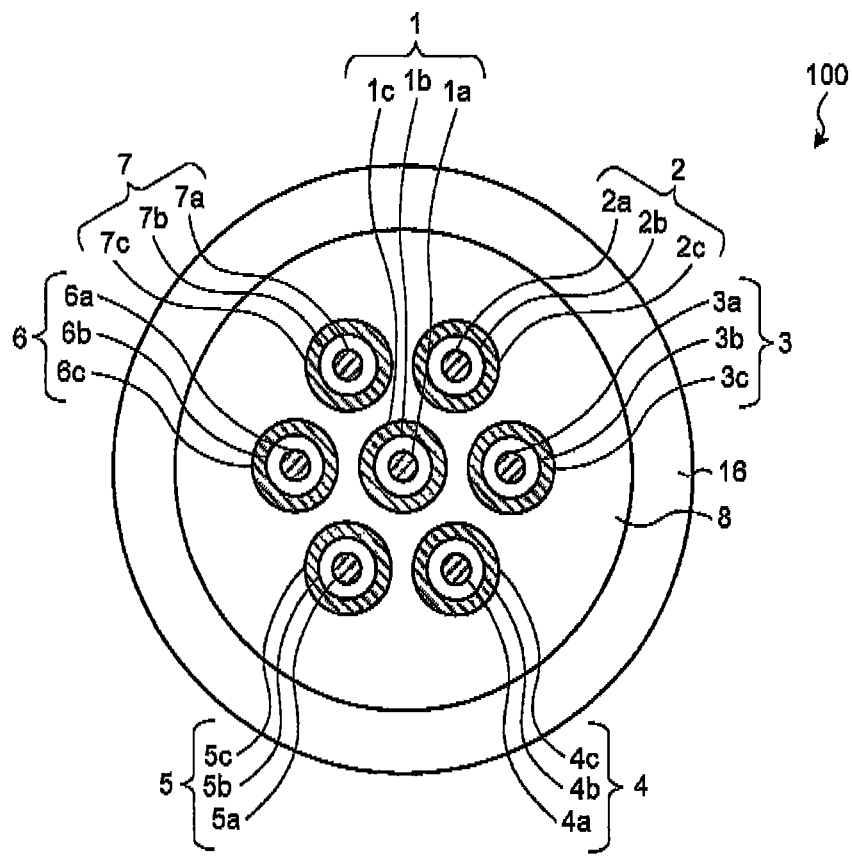
FIG. 1 is a schematic cross-sectional view of a multi-core optical fiber according to a first embodiment of the present invention.

Exemplary embodiments of a multi-core optical fiber and a method of manufacturing the same according to the present invention will be explained in details below with reference to the accompanying drawings. The present invention is not limited to the embodiments. In the drawings, identical or corresponding elements are appropriately denoted by identical symbols. In the present specification, a cut-off wavelength ($\lambda_c$) is the shortest wavelength of wavelengths that have a confinement loss of a high-order mode being 10 dB/m or greater. Moreover, a cable cut-off wavelength ($\lambda_{cc}$) denotes a cable cut-off wavelength defined by the International Telecommunication Union Telecommunication Standardization Sector (ITU-T) G. 650. A bending loss is a value caused by winding around a diameter of 20 mm at a wavelength of wavelength 1.55 μm. Further, other terms that are not particularly defined in the present specification may be compliant with the definitions and the measuring methods according to the ITU-T G. 650.

First Embodiment

FIG. 1 is a schematic cross-sectional view of a multi-core optical fiber according to the first embodiment. As illustrated in FIG. 1, a multi-core optical fiber 100 includes seven core portions 1 to 7, a cladding portion 8 positioned so as to surround an outside of each of the core portions 1 to 7. The core portions 1 to 7 include center core portions 1a to 7a positioned at the centers of the core portions 1 to 7; second core portions 1b to 7b that are formed so as to surround outsides of the center core portions 1a to 7a; and depressed portions 1c to 7c that are formed so as to surround the second core portions 1b to 7b, respectively. A coating portion 16 is formed on an outer circumference of the cladding portion 8.

The core portion 1 is close to the central axis of the multi-core optical fiber 100. The other core portions 2 to 7 are positioned substantially at the vertices of a regular hexagon with the core portion 1 at the center.

Each of the core portions 1 to 7 and the cladding portion 8 is made of, for example, silica based glass. The cladding portion 8 has a refractive index less than the refractive index of the center core portions 1a to 7a. The second core portions 1b to 7b have a refractive index less than the refractive index of the center core portions 1a to 7a. The depressed portions 1c to 7c have a refractive index less than the refractive index of the second core portions 1b to 7b and the refractive index of the cladding portion 8. For example, the center core portions 1a to 7a are made of silica glass doped with Ge, which is a dopant that increases the refractive index. The second core portions 1b to 7b and the cladding portion 8 are made of pure silica glass that contains no refractive-index adjusting dopant. The depressed portions 1c to 7c are made of silica glass doped with fluorine (F), which is a dopant that decreases the refractive index.

The coating portion 16 has a thickness that is appropriately set to protect the cladding portion 8. The thickness is, for example, 62.5 μm.

Figure 2:
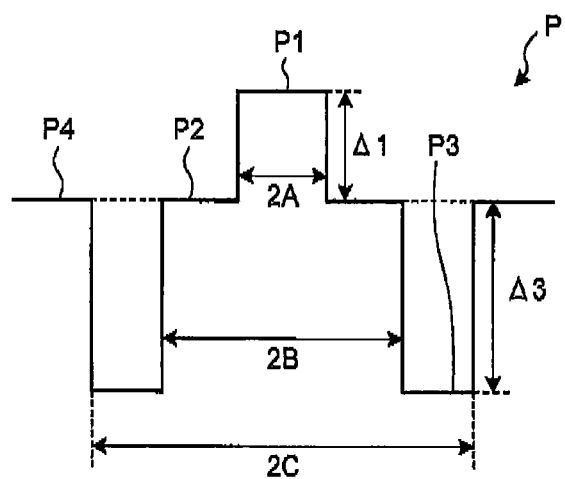
FIG. 2 is a diagram of a refractive index profile surrounding a core portion of the multi-core optical fiber illustrated in FIG. 1.

FIG. 2 is a diagram of a refractive index profile surrounding the core portion 1 of the multi-core optical fiber 100 illustrated in FIG. 1. As illustrated in FIG. 2, a refractive index profile P is a trench-assisted profile.

In the refractive index profile P, portions P1, P2, P3, and P4 are the refractive index profiles of the center core portion 1a, the second core portion 1b, the depressed portion 1c, and the cladding portion 8, respectively. Relative refractive-index differences Δ1, Δ2, and Δ3 are defined by the following equations (1) to (3), respectively, where the maximum refractive index of the core portion 1 is n1, the refractive index of the second core portion 1b is n2, the minimum refractive index of the depressed portion 1c is n3, and the refractive index of the cladding portion 8 is nc:

$$\Delta 1 = \{(n1-nc)/nc\} \times 100 [\%] \quad (1)$$

$$\Delta 2 = \{(n2-nc)/nc\} \times 100 [\%] \quad (2)$$

$$\Delta 3 = \{(n3-nc)/nc\} \times 100 [\%] \quad (3)$$

A diameter 2A of the center core portion 1a (core diameter) is defined as a diameter at a position of half of Δ1. A diameter 2B of the second core portion is defined as an outside diameter at a position having a relative refractive index difference equal to a half of Δ3 on a boundary area between the second core portion 1b and the depressed portion 1c. An outside diameter 2C of the depressed portion 1c is defined as an outside diameter at a position having a relative refractive-index difference equal to a half of Δ3 on a boundary area between the depressed portion 1c and the cladding portion 8.

The ratio of the outside diameter 2B of the second core portion 1b to the core diameter 2A, and the ratio of the outside diameter 2C of the depressed portion 1c to the core diameter 2A are hereinafter denoted as Ra2=B/A and Ra3=C/A, respectively. All the core portions 1 to 7 of the multi-core optical fiber 100 according to the first embodiment have the same design parameters, i.e., the same Δ1, the same Δ3, the same 2A, the same Ra2, and the same Ra3.

Optical cross-talk in the multi-core optical fiber 100 will be explained more specifically. In a waveguide structure where two core portions of the multi-core optical fiber 100 (e.g., the core portions 1 and 2) are parallel to each other, the magnitude of the interference of light between the core portions is expressed by the mode coupling theory. Light is input to the core portion 1 and transferred to the other core portion 2 due to mode coupling while transmitting through the core portion 1. The power Pw of the transferred light is given by the following equation (4) using a transmission distance z and a mode coupling constant χ between the two core portions:

$$Pw = f \times \sin^2(\chi z) \quad (4)$$

In Equation (4), if the core portion 1 and the core portion 2 have the same design parameters, then f=1. Therefore, if z=π/(2χ), then Pw=1 and 100% of the power of the light transfers from one core portion to the other core portion. The transmission distance needed for 100% transfer of the power of light is called coupling length L. Namely, L=π/(2χ). The mode coupling constant χ is decided by using the respective core diameters of the core portions 1 and 2, the relative refractive-index difference, and the interval distance between the core portions 1 and 2.

If the interval distance between the core portion 1 and the core portion 2 is set such that the mode coupling constant χ becomes 3.16×10$^{-7}$/m with respect to predefined core diameters of the core portions 1 and 2, a predefined relative refractive-index difference, and a desired total length, the cross-talk between the core portions for the desired total length is equal to or less than −30 dB, i.e., the cross-talk of an optical signal transmitting through the two core portions 1 and 2 is sufficiently low.

In the multi-core optical fiber 100, core portions adjacent to the core portion 1 are the core portions 2 to 7 and the number of the adjacent core portions is six. In contrast, the number of core portions adjacent to any of the core portions 2 to 7 is three and the other three core portions are separated away farther than the adjacent three core portions. Because the cross-talk between core portions decreases drastically as the interval distance increases, it is only necessary to consider the cross-talk between the adjacent core portions.

Therefore, in the multi-core optical fiber 100, the interval distances between adjacent core portions are set by taking cross-talk of the core portion 1 into consideration because the core portion 1 has the largest number of adjacent core portions and the highest cross-talk.

It is assumed, for example, Δ1 is from 0.05 to 1.2%, Δ2 is 0%, Δ3 is equal to or greater than −0.7%, more preferably greater than −0.6%, 2A is from 4 to 14 μm, Ra2 is from 1 to 3, (Ra3−Ra2) is equal to or less than 2, the cut-off wavelength is from 1 to 1.53 µm, and the effective core area at the wavelength 1.55 µm is from 30 to 180 µm². In this case, if the interval distance between the core portion 1 and any of the other core portions 2 to 7 is set to a value equal to or greater than 40 µm, when the total length of the multi-core optical fiber 100 is 100 km, cross-talk at the core portion 1 of optical signals that are individually transmitted through the respective core portions 2 to 7 is equal to or less than −30 dB. Because cross-talk of the other core portions 2 to 7 is less than the cross-talk of the core portion 1, it is definitely equal to or less than −30 dB. Even when the total length of the multi-core optical fiber 100 is greater than 100 km, it is possible to decrease the cross-talk between the core portions to −30 dB or less by setting the interval distance between the core portions to be a value greater than 40 µm.

By using an FEM (Finite Element Method)-based simulation result, the cross-talk of the multi-core optical fiber 100 will be described below using a bending loss that is correlated with the cross-talk. In general, the correlation between the cross-talk and the bending loss of an optical fiber is a positive correlation; as the bending loss decreases, the cross-talk also decreases. Firstly, the relationship among Ra2, (Ra3−Ra2) and the bending loss will be described. It is noted that the relative refractive-index difference Δ2 is fixed to 0% and the core diameter 2A and the relative refractive-index difference Δ1 are set to values so that the cut-off wavelength becomes 1.31 µm and the effective core area becomes 80 µm².

Figure 3:
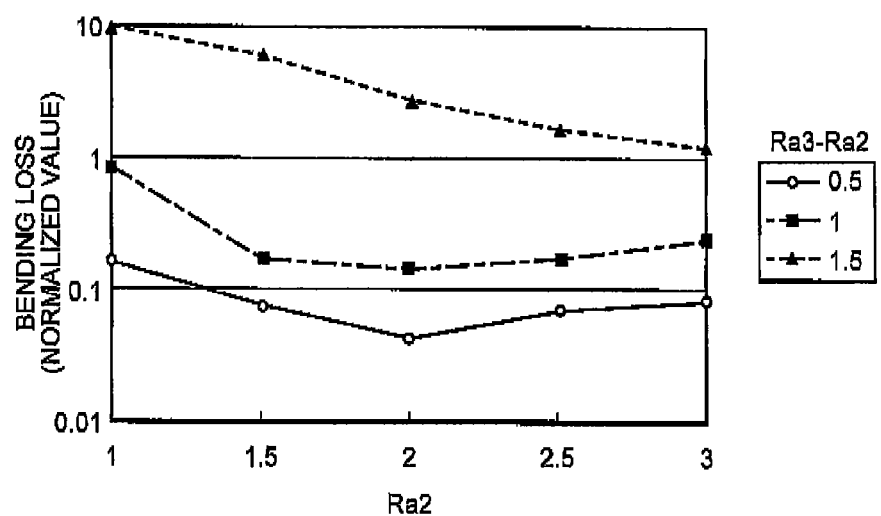
FIG. 3 is a graph that depicts the relation between Ra2 and the bending loss (normalized value) where Δ3 is −0.6% and (Ra3−Ra2) is 0.5, 1, or 1.5.
Figure 4:
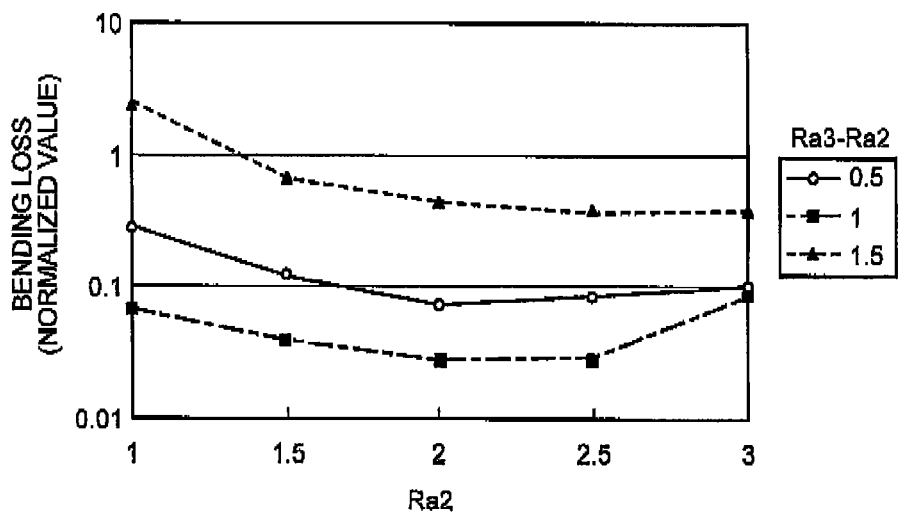
FIG. 4 is a graph that depicts the relation between Ra2 and the bending loss (normalized value) where Δ3 is −0.4% and (Ra3−Ra2) is 0.5, 1, or 1.5.
Figure 5:
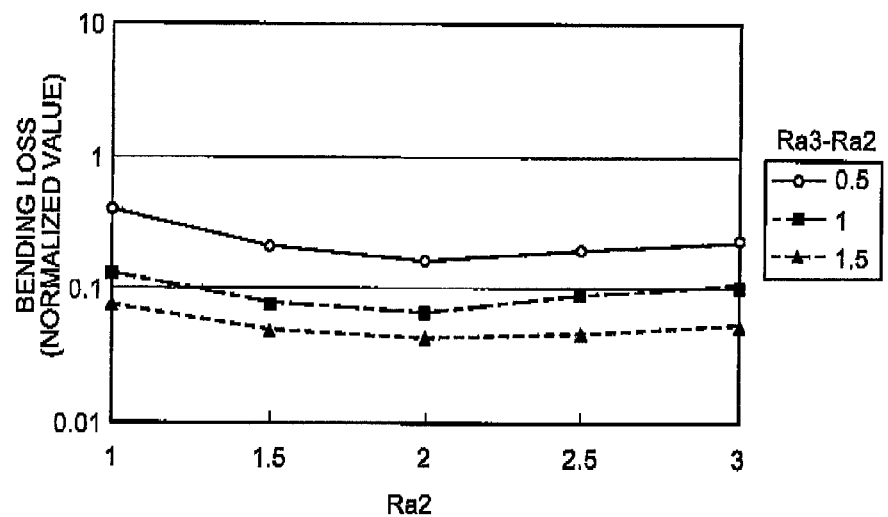
FIG. 5 is a graph that depicts the relation between Ra2 and the bending loss (normalized value) where Δ3 is −0.2% and (Ra3−Ra2) is 0.5, 1, or 1.5.

FIG. 3 is a graph that depicts the relation between Ra2 and the bending loss where Δ3 is −0.6% and (Ra3−Ra2) is 0.5, 1, or 1.5. FIG. 4 is a graph that depicts the relation between Ra2 and the bending loss where Δ3 is −0.4% and (Ra3−Ra2) is 0.5, 1, or 1.5. FIG. 5 is a graph that depicts the relation between Ra2 and the bending loss where Δ3 is −0.2% and (Ra3−Ra2) is 0.5, 1, or 1.5. The bending loss of FIGS. 3 to 5 denotes a value of a bending loss [dB/m] calculated using a combination of the above design parameters and then normalized with reference to a given bending loss [dB/m] in which no depressed portion is present (i.e., Δ3 is 0%), the refractive index profile is a step-index profile, and the relative refractive-index difference Δ1 is set so that the cut-off wavelength becomes 1.31 µm and the effective core area becomes 80 µm².

As illustrated in FIGS. 3 to 5, if the multi-core optical fiber 100 according to the first embodiment has (Ra3−Ra2) being 0.5, 1, or 1.5 and Ra2 being from 1 to 3, the normalized value of the bending loss is less than 1 and, preferably, equal to or less than 0.2; therefore, when the multi-core optical fiber 100 is compared with some other optical fiber having a step-index refractive index profile and having the same cut-off wavelength and the same effective core area as those of the multi-core optical fiber 100, the bending loss decreases to a low value, preferably, a value equal to or less than ⅕ of the bending loss of the other optical fiber.

Figure 6:
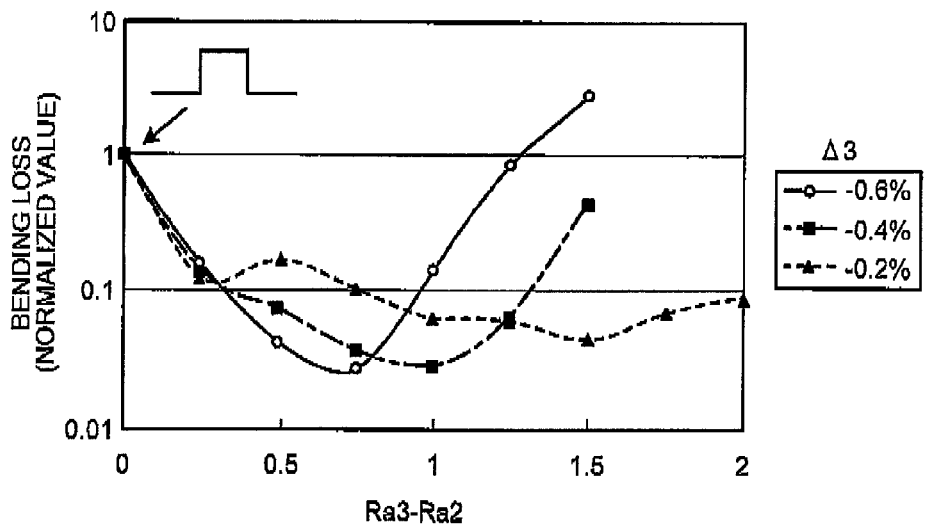
FIG. 6 is a graph that depicts the relation between (Ra3−Ra2) and the bending loss (normalized value) where Ra2 is 2 and Δ3 is −0.6%, −0.4%, or −0.2%.

FIG. 6 is a graph that depicts the relation between (Ra3−Ra2) and the bending loss (normalized value) where Ra2 is 2 and Δ3 is −0.6%, −0.4%, or −0.2%. In FIG. 6, (Ra3−Ra2) of 0 indicates that no depressed portion is present and the refractive index profile is a step-index profile.

As illustrated in FIG. 6, the multi-core optical fiber 100 according to the first embodiment enables a further decrease in the bending loss by setting, depending on the value of Δ3, the value of (Ra3−Ra2), i.e., the layer thickness of the depressed portion to a value equal to or less than 2. A further decrease in Δ3 also decreases the bending loss further.

In the above FIGS. 4 to 6, the core diameter 2A and the relative refractive-index difference Δ1 are set to values so that the cut-off wavelength becomes 1.31 µm and the effective core area becomes 80 µm². In the following, the value of the core diameter 2A and the value of the relative refractive-index difference Δ1 are described in accordance with changes in the cut-off wavelength and the effective core area. It is noted that the relative refractive-index difference Δ2 is fixed to 0% and the relative refractive-index difference Δ3, Ra2, and (Ra3−Ra2) are set to a combination of values so that the bending loss is at the lowest in FIG. 6, i.e., Δ3 is fixed to −0.6%, Ra2 is fixed to 2, and (Ra3−Ra2) is fixed to 0.75. The cut-off wavelength is changed to 1 µm, 1.31 µm, and 1.53 µm and the effective core area is changed from 30 to 180 µm².

Figure 7:
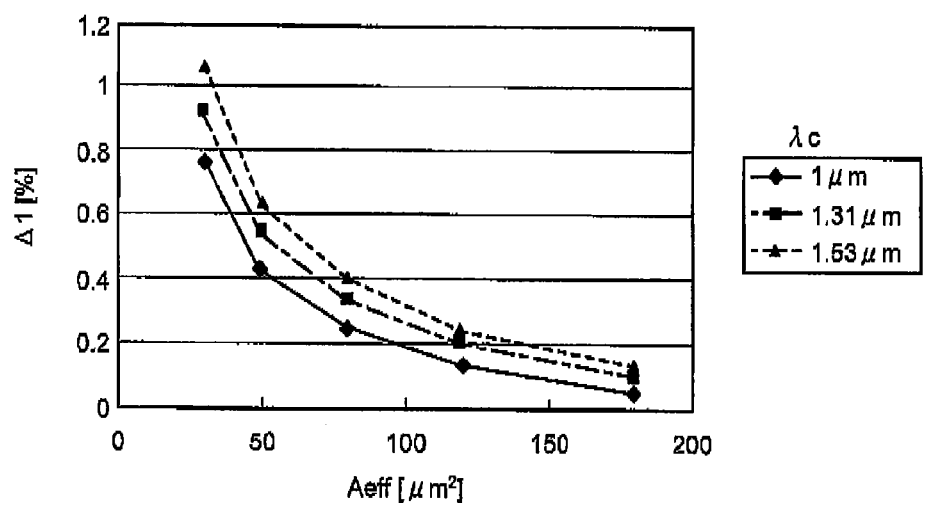
FIG. 7 is a graph that depicts the relation between Aeff and Δ1 where the cut-off wavelength is 1 μm, 1.31 μm, or 1.53 μm.
Figure 8:
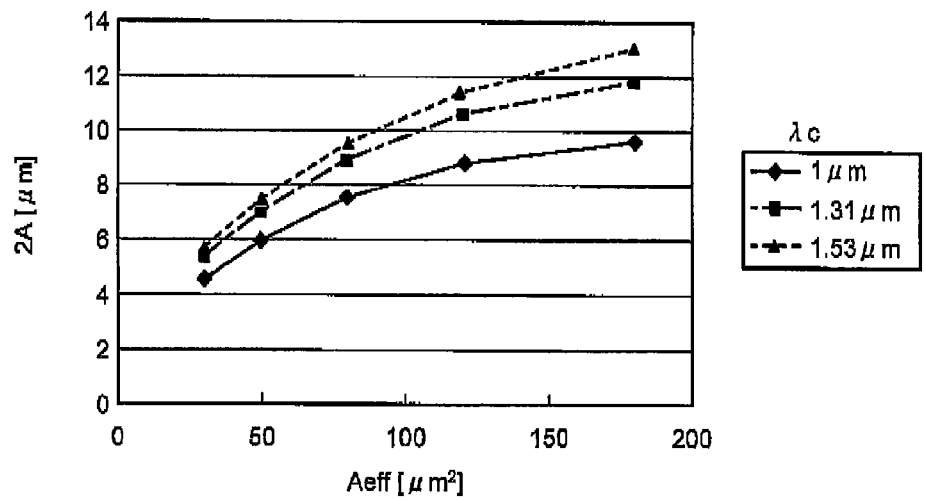
FIG. 8 is a graph that depicts the relation between Aeff and 2A where the cut-off wavelength is 1 μm, 1.31 μm, or 1.53 μm.

FIG. 7 is a graph that depicts the relation between the effective core area Aeff and the relative refractive-index difference Δ1 where the cut-off wavelength is 1 µm, 1.31 µm, ox 1.53 µm. FIG. 8 is a graph that depicts the relation between the effective core area Aeff and the core diameter 2A where the cut-off wavelength is 1 µm, 1.31 µm, or 1.53 µm. As illustrated in FIGS. 7 and 8, to set the bending loss to a value close to the lowest value when the cut-off wavelength is from 1 to 1.55 µm and the effective core area is from 30 to 180 µm², the relative refractive-index difference Δ1 needs to be from 0.05 to 1.2% and 2A needs to be from 4 to 14 µm.

Figure 9:
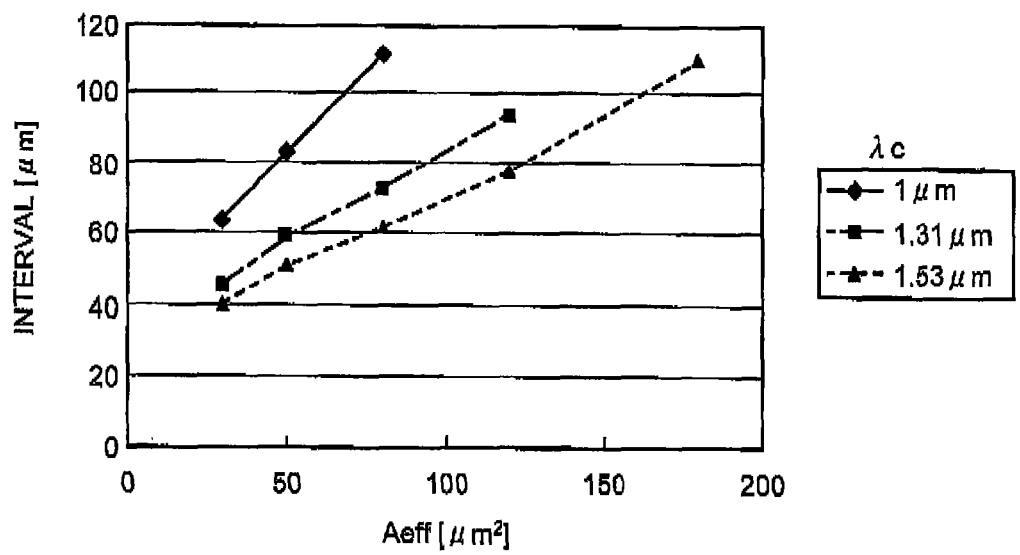
FIG. 9 is a graph that depicts the relation between Aeff and the interval distance between core portions where the cut-off wavelength is 1 μm, 1.31 μm, or 1.53 μm.

FIG. 9 is a graph that depicts the relation between Aeff and the interval distance between adjacent core portions where the cut-off wavelength is 1 µm, 1.31 µm, or 1.53 µm. The interval distance illustrated in FIG. 9 is set so that, when the total length is 100 km, the optical cross-talk between adjacent core portions becomes −30 dB. Therefore, if, with respect to each Aeff, the interval distance is a value equal to or greater than the value denoted by the data point, the cross-talk is equal to or less than −30 dB. As illustrated in FIG. 9, the effective core area is from 30 to 180 µm², the interval distance is equal to or greater than 40 µm.

As described above, if the multi-core optical fiber 100 according to the first embodiment has Δ1 from 0.05 to 1.2%, Δ2 of 0%, Δ3 equal to or greater than −0.6%, 2A from 4 to 14 µm, Ra2 from 1 to 3, (Ra3−Ra2) equal to or less than 2, the cut-off wavelength from 1 to 1.53 µm, and the effective core area at the wavelength 1.55 µm being from 30 to 180 µm², when the total length is equal to or greater than 100 km, by setting the interval distance between core portions to a value equal to or greater than 40 µm, the cross-talk equal to or less than −30 dB is achieved. The effective core area of 115 µm² or larger at the wavelength 1.55 µm is preferably achieved when Δ1 is set 0.29% or less while the ranges of the other structural parameters are the same range as described above. The effective core area of 135 µm² or larger at the wavelength 1.55 µm is preferably achieved when Δ1 is set 0.21% or less while the ranges of the other structural parameters are the same range as described above.

(Manufacturing Method)

Figure 10:
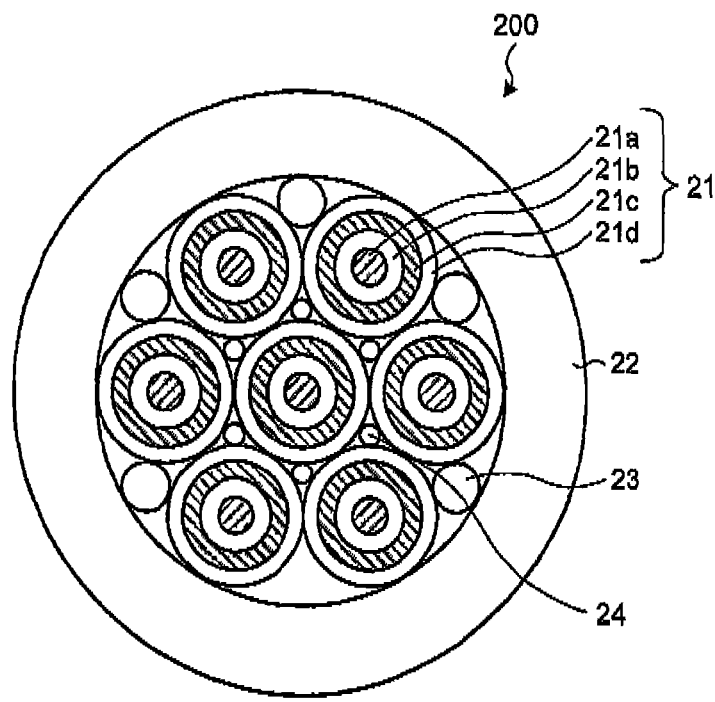
FIG. 10 is a diagram that explains an example of a method of manufacturing the multi-core optical fiber according to the first embodiment.

A method of manufacturing the multi-core optical fiber 100 according to the first embodiment will be explained below. FIG. 10 is a diagram that explains an example of the method of manufacturing the multi-core optical fiber 100 according to the first embodiment. As illustrated in FIG. 10, in this manufacturing method, firstly, seven capillaries 21 are arranged inside a glass tube 22, which is a glass member that is used to form the cladding portion 8. The capillaries 21 are produced by using the VAD (Vapor phase Axial Deposition) method or the like and have center core areas 21a that are used to form the center core portions of any of the core portions 1 to 7, second core areas 21b that are used to form the second core portions, depressed areas 21c that are used to form the depressed portions, and the cladding areas 21d that are used to form part of the cladding portion 8.

After that, interspace inside the glass tube 22 is filled with filling capillaries 23 and 24 that are made of the same material as the material of the cladding portion 8, and thus an optical fiber preform 200 is produced. The interspace can be filled with glass powder instead of the filling capillaries 23 and 24.

Subsequently, an optical fiber is drawn from the optical fiber preform 200 while maintaining an outside diameter of the optical fiber that has been calculated so as to realize a predetermined core diameter and a predetermined interval distance between the core portions. Thus, the multi-core optical fiber 100 as illustrated in FIG. 1 is manufactured.

Figure 11:
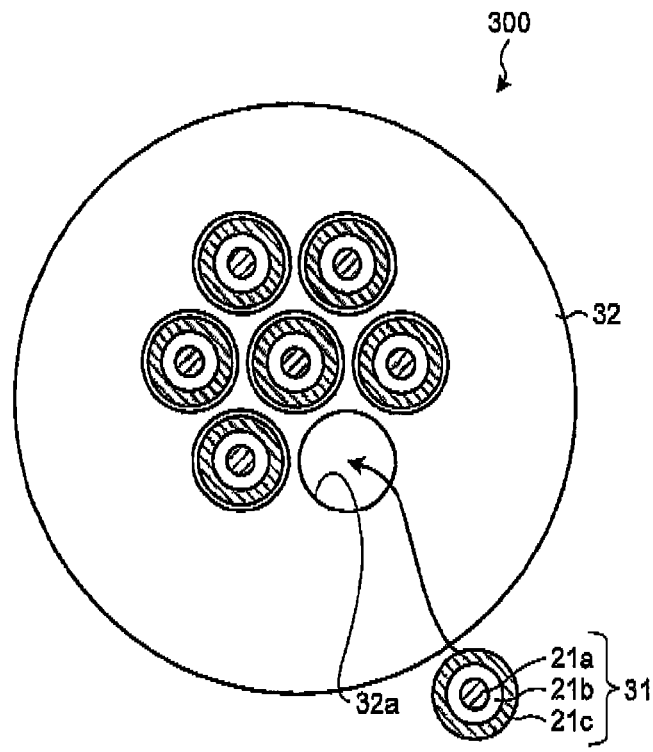
FIG. 11 is a diagram that explains another example of the method of manufacturing the multi-core optical fiber according to the first embodiment.

FIG. 11 is a diagram that explains another example of the method of manufacturing the multi-core optical fiber 100 according to the first embodiment. As illustrated in FIG. 11, in this manufacturing method, seven capillaries 31 are prepared first. Each of the capillaries 31 has the center core area 21a, the second core area 21b that is formed concentrically, and the depressed area 21c.

Then, to form the cladding portion 8, by using a drill or the like, seven holes 32a having the inner diameter slightly greater than the outside diameter of the capillaries 31 are formed on a pure silica glass bar in a longitudinal direction and thus a glass member 32 is produced. Then, the capillaries 31 are inserted into the holes 32a of the glass member 32 and thus an optical fiber preform 300 is formed.

Subsequently, an optical fiber is drawn from the optical fiber preform 300 while maintaining an outside diameter of the optical fiber that has been calculated so as to realize a predetermined core diameter and a predetermined interval distance between the core portions. Thus, the multi-core optical fiber 100 as illustrated in FIG. 1 is manufactured.

Because, according to the method illustrated in FIG. 11, the seven capillaries 31 are inserted into the holes 32a of the glass member 32, the capillaries 31 are arranged with a high positional accuracy; therefore, in the multi-core optical fiber 100, the positional accuracy of the core portions 1 to 7 is high. Moreover, because the number of the glass layers of the capillaries 31 is less than the number of the glass layers of the capillaries 21 because of the absence of the cladding area 21d, the multi-core optical fiber can be manufactured easily with a less number of processes and at a low cost.

The glass member 32 can be produced by using not a drill process but a well-known sol-gel process. In this case, a method can be used for arranging the capillaries 31 inside the glass member 32, the method involving, for example, arranging the capillaries 31 inside a glass tube in advance, pouring sol into the glass tube as the material of the glass member 32, and then converting the sol into gel, thereby forming the glass member 32.

Second Embodiment

In the multi-core optical fiber 100 according to the above first embodiment, all the core portions 1 to 7 are identical to each other. That is, the core portions 1 to 7 have the same $\Delta 1$, the same $\Delta 3$, the same 2A, the same Ra2, and the same Ra3. In contrast, a multi-core optical fiber 400 according to the second embodiment includes a non-identical core portion. At least one of $\Delta 1$, $\Delta 3$, and 2A of the non-identical core portion is different from that of the other core portions.

Figure 12:
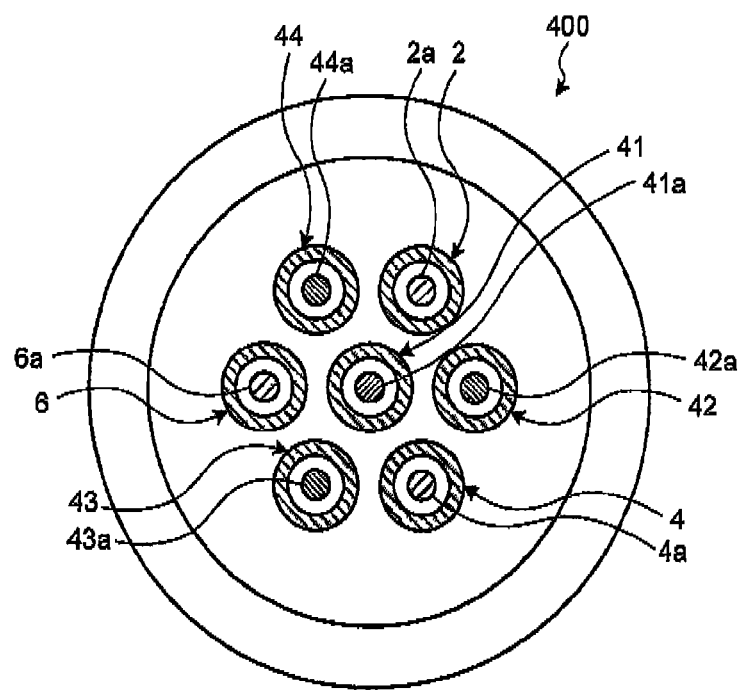
FIG. 12 is a schematic cross-sectional view of a multi-core optical fiber according to a second embodiment of the present invention.

FIG. 12 is a schematic cross-sectional view of a multi-core optical fiber 400 according to the second embodiment. As illustrated in FIG. 12, the multi-core optical fiber 400 is configured, based on the multi-core optical fiber 100 illustrated in FIG. 1, by replacing the center core portions 1a, 3a, 5a, and 7a of the core portions 1, 3, 5, and 7 with center core portions 41a, 42a, 43a, and 44a, respectively to form core portions 41, 42, 43, and 44, respectively. The value of at least one of $\Delta 1$, $\Delta 3$, 2A, Ra2, and Ra3 of the core portion 41 is different by about 1% or more from the corresponding value of the core portions 2, 4, and 6. The core portions 42, 43, and 44 have the same $\Delta 1$, the same $\Delta 3$, the same 2A, the same Ra2, and the same Ra3. The value of at least one of the design parameters $\Delta 1$, $\Delta 3$, 2A, Ra2, and Ra3 of each of the core portions 42, 43, and 44 is different from that of the core portions 2, 4, and 6 and the core portion 41. In other words, the core portions 2, 4, and 6 are different from the core portion 41, the core portion 41 is different from the core portions 42, 43, and 44, and the core portions 2, 4, and 6 are different from the core portions 42, 43, and 44.

It is noted that the core portion 41 and the core portions 42, 43, and 44 have, for example, $\Delta 1$ from 0.05 to 1.2%, $\Delta 2$ of 0%, $\Delta 3$ equal to or greater than −0.6%, 2A from 4 to 14 μm, Ra2 from 1 to 3, (Ra3−Ra2) equal to or less than 2, the cut-off wavelength from 1 to 1.53 μm, the effective core area at the wavelength 1.55 μm being from 30 to 180 μm$^2$.

As disclosed in M. Koshiba, et al., the maximum power of light transferred between the non-identical core portions having different design parameters is decreased because the coefficient f in the above equation (4) is less than 1. Therefore, even if the same cross-talk is achieved, the interval distance between the non-identical core portions can be less than the interval distance between the identical core portions having the same design parameters. In contrast, in order to achieve the cross-talk of −30 dB, for example, the interval distance between the identical core portions needs to be set in the same manner as in the multi-core optical fiber 100 according to the first embodiment.

Therefore, in the multi-core optical fiber 400 according to the second embodiment, the core portions 2, 4, and 6 are arranged so that the interval distance between any of them becomes the longest and the core portions 42, 43, and 44 are arranged so that the interval distance between any of them becomes the longest. Accordingly, even if the interval distance between any of the core portions 2, 4, and 6 is equal to or greater than 40 μm, for example, 40 μm and the interval distance between any of the core portions 42, 43, and 44 is equal to and greater than 40 μm, for example, 40 μm, the cross-talk between an arbitrary core portion selected from the core portions 2, 4, and 6, the core portion 41, and the core portions 42, 43, and 44 and an adjacent core portion is equal to or less than −30 dB.

In this case, because the core portions 2, 4, and 6, the core portion 41, the core portions 42, 43, and 44 are positioned at the vertices and the center of a regular hexagon, the interval distance between the adjacent core portions is 40 μm×1/√3, i.e., about 23.1 μm, which is much less than 40 μm in the first embodiment. In other words, the multi-core optical fiber 400 according to the second embodiment enables core portions to be arranged more densely.

As a modification of the second embodiment, a multi-core optical fiber can be formed by replacing, based on the multi-core optical fiber 100 according to the first embodiment, all the core portions 1 to 7 except any two core portions with core portions different from each other. In this case, if, for example, all the core portions other than the core portions 2 and 5 are replaced with different core portions and the interval distance between the identical core portions 2 and 5 is set to, for example, 40 μm, then the cross-talk of each core portion is achieved to be −30 dB. Because this arrangement allows the interval distance between adjacent core portions to be 40 μm×½, i.e., 20 μm, it is possible to arrange the core portions more densely.

Third Embodiment

Figure 13:
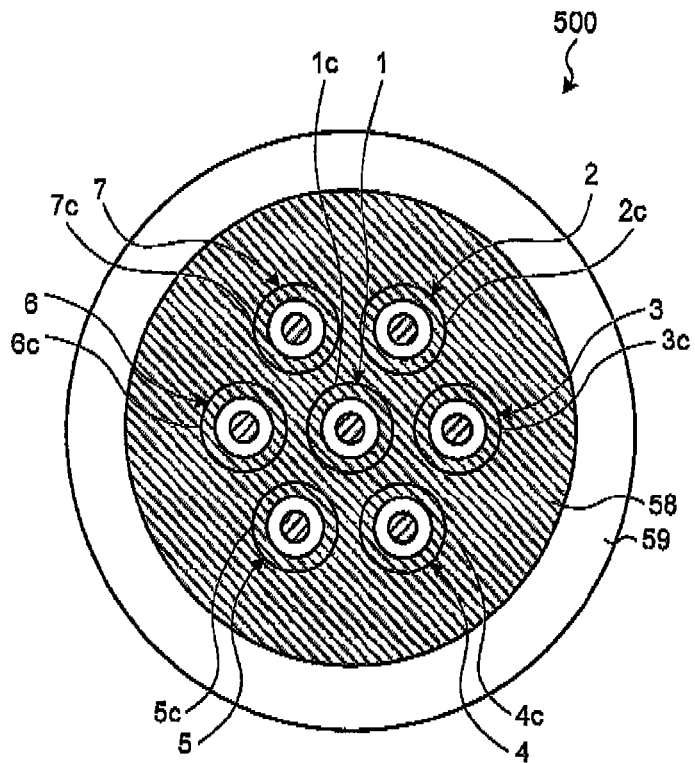
FIG. 13 is a schematic cross-sectional view of a multi-core optical fiber according to a third embodiment of the present invention.

A multi-core optical fiber according to a third embodiment of the present invention will be explained below. FIG. 13 is a schematic cross-sectional view of a multi-core optical fiber 500 according to the third embodiment. As illustrated in FIG. 13, the multi-core optical fiber 500 is configured, based on the multi-core optical fiber 100 according to the first embodiment, by replacing the cladding portion 8 that is on the outer circumference of each of the depressed portions 1c to 7c of the core portions 1 to 7 with a cladding portion 58 that has the same refractive index difference as that of the depressed portions 1c to 7c and is integrated with the depressed portions 1c to 7c. On the outer circumference of the cladding portion 58 is formed a coating portion 59.

The refractive index profile of the multi-core optical fiber 500 is also a trench-assisted profile. In the multi-core optical fiber 500, an outside radius of a depressed portion is defined as a distance between the center of a given core portion and the edge of the cladding portion that is formed on the outer circumference of another core portion most adjacent to the given core portion. For example, in case of the core portion 1, the outside radius refers to the distance to the edge of the cladding portion 58 that is on the outer circumference of, for example, the adjacent core portion 2 (the boundary between the cladding portion 58 and the second core portion 2b). For example, in case of the core portion 2, the outside radius refers to the distance to the edge of the cladding portion 58 that is on the outer circumference of, for example, the adjacent core portion 3 (the boundary between the cladding portion 58 and the second core portion 3b).

If the multi-core optical fiber 500 has, for example, $\Delta 1$ of 0.34%, $\Delta 3$ of –0.2%, 2A of 7.97 μm, Ra2 of 4, and (Ra3–Ra2) of 1.5, then the effective core area at the wavelength 1.55 μm is 80 μm$^2$ and the interval distance between any of the core portions 1 to 7 is about 37.9 μm. Because this interval distance is greater than 36.43 μm, which is the interval distance that is needed, when the total length is 1 km, to decrease the cross-talk between any of the core portions 1 to 7 to –30 dB, the cross-talk between any of the core portions 1 to 7 is equal to or less than –30 dB.

Figure 14:
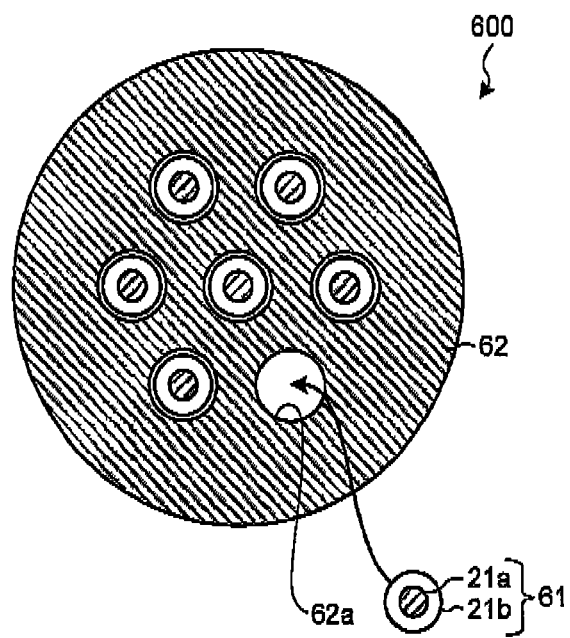
FIG. 14 is a diagram that explains an example of a method of manufacturing the multi-core optical fiber according to the third embodiment.

The multi-core optical fiber 500 is manufactured in the following manner. FIG. 14 is a diagram that explains an example of a method of manufacturing the multi-core optical fiber 500 according to the third embodiment. As illustrated in FIG. 14, in this manufacturing method, in the same manner as in the manufacturing manner illustrated in FIG. 11, seven capillaries 61 are prepared first. Each of the capillaries 61 has the center core area 21a and the concentrically formed second core area 21b that is used to form any of the second core portions.

Then, to form the cladding portion 58, by using a drill or the like, seven holes 62a having the inner diameter slightly greater than the outside diameter of the capillaries 61 are formed on an edge surface of a pure silica glass bar doped with fluorine and thus a glass member 62 is produced. Then, the capillaries 61 are inserted into the holes 62a of the glass member 62 and thus an optical fiber preform 600 is formed.

Subsequently, an optical fiber is drawn from the optical fiber preform 600 while maintaining an outside diameter of the optical fiber that has been calculated so as to realize a predetermined core diameter and a predetermined interval distance between the core portions. Thus, the multi-core optical fiber 500 as illustrated in FIG. 13 is manufactured.

According to the method illustrated in FIG. 14, in the same manner as in the method illustrated in FIG. 11, the capillaries 61 are arranged with a high positional accuracy; therefore, in the multi-core optical fiber 500, the positional accuracy of the core portions 1 to 7 is high. Moreover, because the number of the glass layers of the capillaries 61 is less than even the number of the glass layers of the capillaries 31 because of the absence of the depressed area 21c, the multi-core optical fiber can be manufactured easily with a further less number of processes and at a low cost.

The glass member 62 can be produced, in the same manner as in the glass member 32 illustrated in FIG. 11, by using not a drill process but a sol-gel process.

Figure 15:
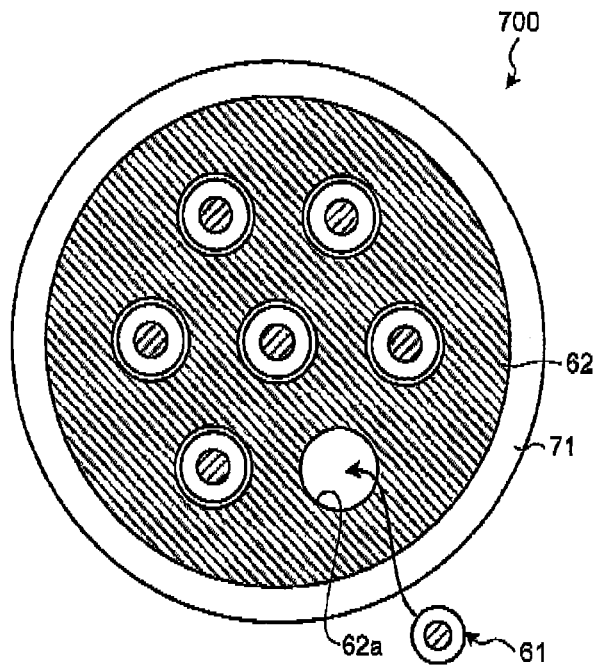
FIG. 15 is a diagram that explains another example of the method of manufacturing the multi-core optical fiber according to the third embodiment.

FIG. 15 is a diagram that explains another example of the method of manufacturing the multi-core optical fiber according to the third embodiment. In FIG. 15, a pure silica glass tube 71 is arranged on the outer circumference of the glass member 62 illustrated in FIG. 14, the capillaries 61 are inserted into the holes 62a of the glass member 62, and thus an optical fiber preform 700 is formed. Although the glass member 62 made of silica glass doped with fluorine is relatively soft, by thus arranging the pure silica glass tube 71 on the outer circumference, the mechanical strength of the optical fiber preform 700 is increased and the outside diameter shape is stabilized.

It is noted that, in the first embodiment and the third embodiment, every core portion has the same design parameters or the same $\Delta 1$, the same $\Delta 3$, the same 2A, the same Ra2, and the same Ra3; in the second embodiment, there are three kinds of core portions. However, the present invention is not limited thereto and the multi-core optical fiber can include core portions some of which or all of which are different from each other.

Because a multi-core optical fiber according to the present invention has a plurality of core portions and the core portions are arranged at a predetermined interval distance, some core portions are close to the outer circumference of the cladding portion. Therefore, it is necessary to take effects of microbending on each core portion into consideration. A microbending loss is defined to be an increased amount in the transmission loss that occurs because, when a lateral pressure is applied to an optical fiber, an optical fiber is bended slightly due to slight bumpiness on the surface of the lateral-pressure-applying object (e.g., a bobbin).

In the following, regarding a single-core optical fiber that has only one core portion being at the center of the cladding portion, where the refractive index profile of the core portion is the same trench-assisted profile as that of the multi-core optical fiber 100 according to the first embodiment, a result of calculation is described about the outside diameter of the cladding portion that needs to achieve the same microbending loss as that of a single-mode optical fiber (SMF) having the outside diameter of the cladding portion of 125 μm that is defined in ITU-T G. 652a. For this calculation, the relative refractive-index difference $\Delta 3$, Ra2, and (Ra3–Ra2) of the trench-assisted single-core optical fiber are fixed to a combination of values such that the bending loss is at the lowest in FIG. 6, i.e., $\Delta 3$ is fixed to –0.6%, Ra2 is fixed to 2, and (Ra3–Ra2) is fixed to 0.75, while the cut-off wavelength is changed to 1 μm, 1.31 μm, and 1.53 μm and the effective core area is changed from 30 to 180 μm$^2$.

Figure 16:
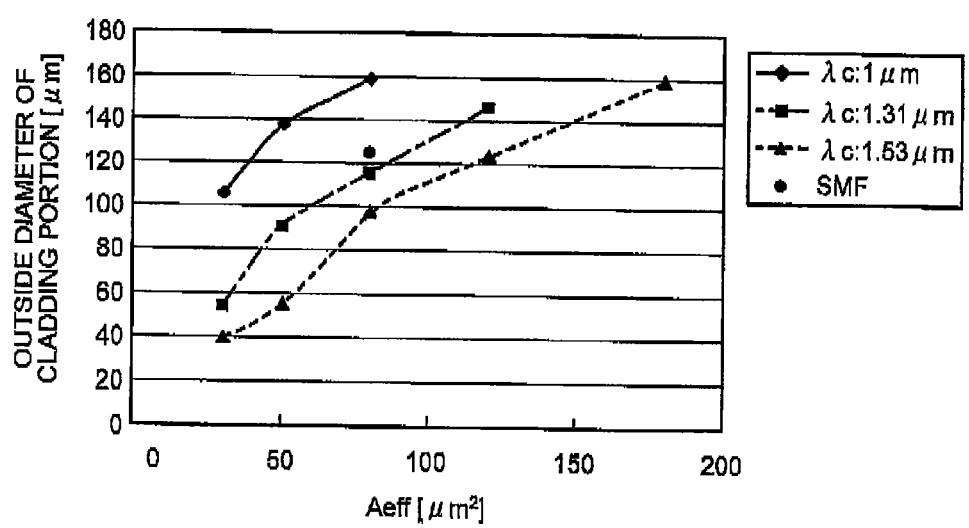
FIG. 16 is a graph that depicts, regarding a trench-assisted single-core optical fiber, the relation between Aeff and the outside diameter of the cladding portion where the cut-off wavelength is 1 µm, 1.31 µm, or 1.53 µm.

FIG. 16 is a graph that depicts, regarding a trench-assisted single-core optical fiber, the relation between Aeff and the outside diameter of the cladding portion that needs to achieve the same microbending loss as that of the SMF where the cut-off wavelength is 1 μm, 1.31 μm, or 1.53 μm. As a comparison, the relation between the outside diameter of the cladding portion and Aeff of the SMF is depicted. As illustrated in FIG. 16, in the trench-assisted single-core optical fiber, if the outside diameter of the cladding portion is equal to or greater than 40 µm, i.e., the outside radius is equal to or greater than 20 µm, the same microbending loss as that of the SMF is achieved. Therefore, in the multi-core optical fiber according to the first embodiment, if the shortest distance between the center of any of the core portions 2 to 7 that is closest to the outer circumference of the cladding portion 8 and the outer circumference of the cladding portion 8 is equal to or greater than 20 µm, all the core portions 1 to 7 achieve the same microbending loss as that of the SMF.

Embodiment Examples 1 to 4, Comparative Example 1, Referential Examples 1 to 3

Figures 17, 18:
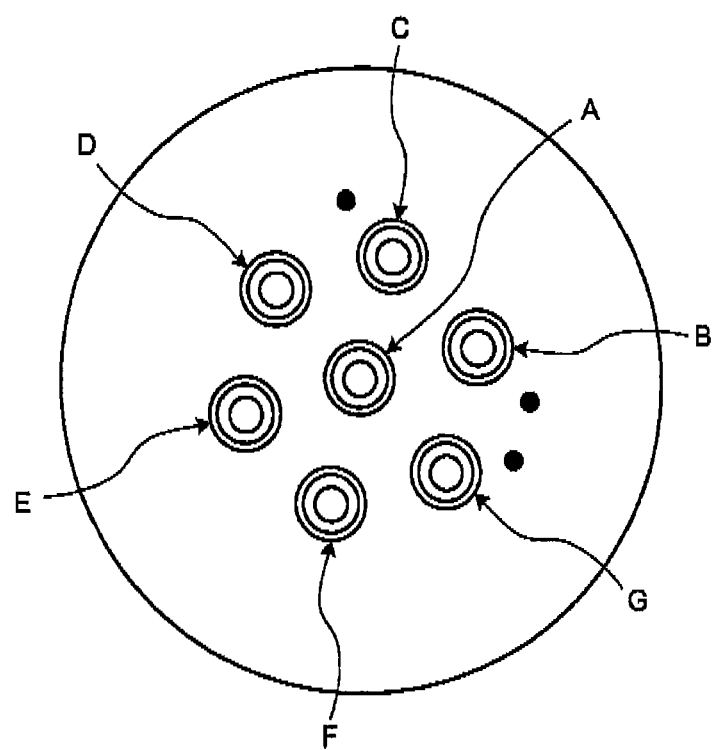
FIG. 17 is a table of design parameters of a core portion that is used to manufacture multi-core optical fibers of Embodiment examples 1 to 4.
FIG. 18 is a schematic cross-sectional view of the manufactured multi-core optical fiber of Embodiment example 1.
Figure 23A:
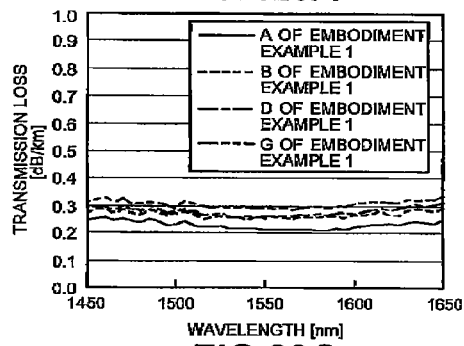
FIGS. 23A to 23D show transmission loss spectra of the multi-core optical fibers of Embodiment examples 1 to 4.
Figure 23B:
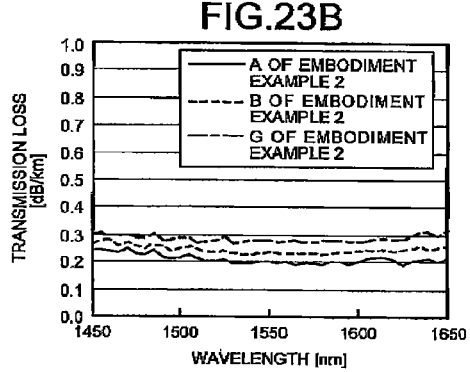
Figure 23C:
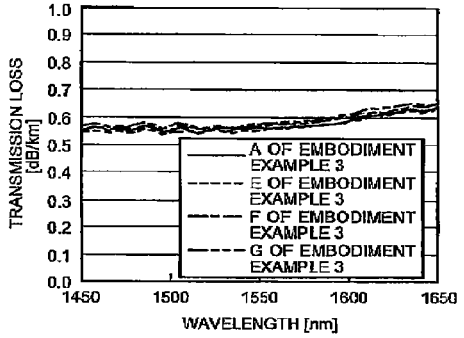
Figure 23D:
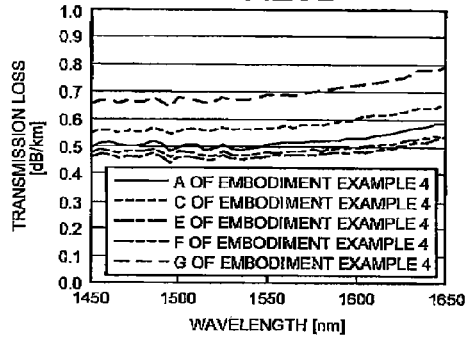

As Embodiment examples 1 to 4 of the present invention, by using the manufacturing method illustrated in FIG. 10, multi-core optical fibers that have seven core portions including a non-identical core portion are manufactured. FIG. 17 is a table of design parameters of a core portion that is used to manufacture the multi-core optical fibers of Embodiment examples 1 to 4. The design parameters of each core portion included in the multi-core optical fibers of Embodiment examples 1 to 4 are values close to the values of the design parameters illustrated in FIG. 17 (2A has a value about ±5% of the value of FIG. 17, while the other design parameters have values about ±2% of the value of FIG. 17).

As Comparative example 1 of the present invention, by using the manufacturing method illustrated FIG. 10, using capillaries having no depressed area, a multi-core optical fiber that has seven core portions including a non-identical core portion is manufactured. The used design parameters of the core portions as follows: Δ1 is 0.34% and 2A is 9.1 µm. In the multi-core optical fiber of Comparative example 1, the refractive index profile of each core portion is a step-index profile.

Moreover, as Referential examples 1 to 3 of the present invention, by using the same capillaries as those used to manufacture the multi-core optical fibers of Embodiment examples 1 to 4 of the present invention, single-core optical fibers are manufactured.

FIG. 18 is a schematic cross-sectional view of the manufactured multi-core optical fiber of Embodiment example 1. In FIG. 18, for the description that will be made later, the core portions are denoted with letters A to G, respectively. In description about the core portions of the multi-core optical fibers of Embodiment examples 2 to 4 and Comparative example 1, the letters A to G are used to indicate the corresponding core portions. Three black circles in the figure are hole markers that are formed to identify the layout of the core portions.

Measurement results of the characteristics of Embodiment examples 1 to 4, Comparative example 1, and Referential examples 1 to 3 will be explained below.

Firstly, the characteristics of the single-core optical fibers of Referential examples 1 to 3 will be described. FIG. 19 is a table of measurement results of the characteristics of the single-core optical fibers of Referential examples 1 to 3. FIG. 20 is a table of a thickness of a cladding portion and an outside diameter of the cladding portion of each of the single-core optical fibers of Referential examples 1 to 3. It is noted that "MFD" refers to "mode field diameter". All the characteristics other than the cable cut-off wavelength $\lambda_{cc}$ are values at the wavelength of 1.55 µm. Referential examples 1 to 3 satisfy the following characteristics: the cut-off wavelength is from 1 to 1.53 µm (1000 to 1530 nm) and the effective core area (Aeff) is from 30 to 180 µm². Especially, the effective core area is achieved to be equal to or greater than 90 µm².

Then, the characteristics of the multi-core optical fibers of Embodiment examples 1 to 4 and Comparative example 1 will be explained. FIG. 21 is a table of measurement results of the characteristics of each of the core portions A to G of the multi-core optical fibers of Embodiment examples 1 to 4 and Comparative example 1. It is noted that "MFD" refers to "mode field diameter". All the characteristics other than the cable cut-off wavelength $\lambda_{cc}$ are values at the wavelength of 1.55 µm. "–" in the table indicates an item unmeasured. In Embodiment examples 1 to 4 illustrated in FIG. 21, the cut-off wavelength is from 1 to 1.53 µm (1000 to 1530 nm) and the effective core area (Aeff) is from 30 to 180 µm², which means that the same characteristics as that of Referential examples 1 to 3 is satisfied. The multi-core optical fibers of Embodiment examples 1 to 4 averagely have the effective core areas greater than and the bending losses less than the effective core area and the bending loss of the multi-core optical fiber of Comparative example 1, which will be described in details later.

FIG. 22 is a table of an interval distance between core portions, a thicknesses of a cladding portion, and an outside diameter of the cladding portion of each of the multi-core optical fibers of Embodiment examples 1 to 4 and Comparative example 1. The thickness of the cladding portion is the shortest distance between the center of any of the core portions that is closest to the outer circumference of the cladding portion and the outer circumference of the cladding portion. Each of the multi-core optical fibers of Embodiment examples 1 to 4 and Comparative example 1 has the thickness of the cladding portion sufficiently high when they are compared with those of Referential examples 1 to 3; therefore, in a communication wavelength bandwidth (1.3 to 1.65 µm) of typical optical communications, it is expected that the core portions are almost free from the effects of microbending.

Figure 24:
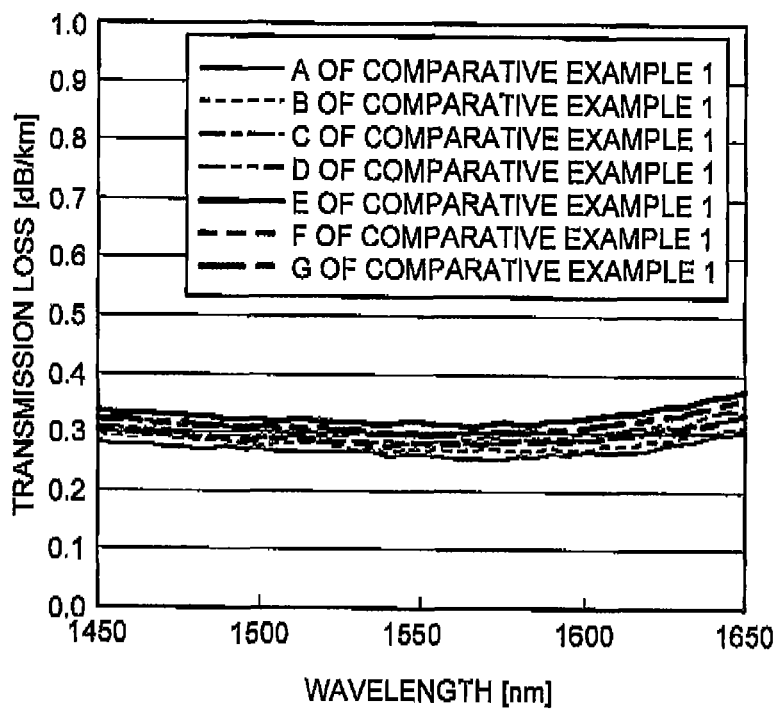
FIG. 24 is a graph of the transmission loss spectrum of the multi-core optical fiber of Comparative example 1.
Figure 25:
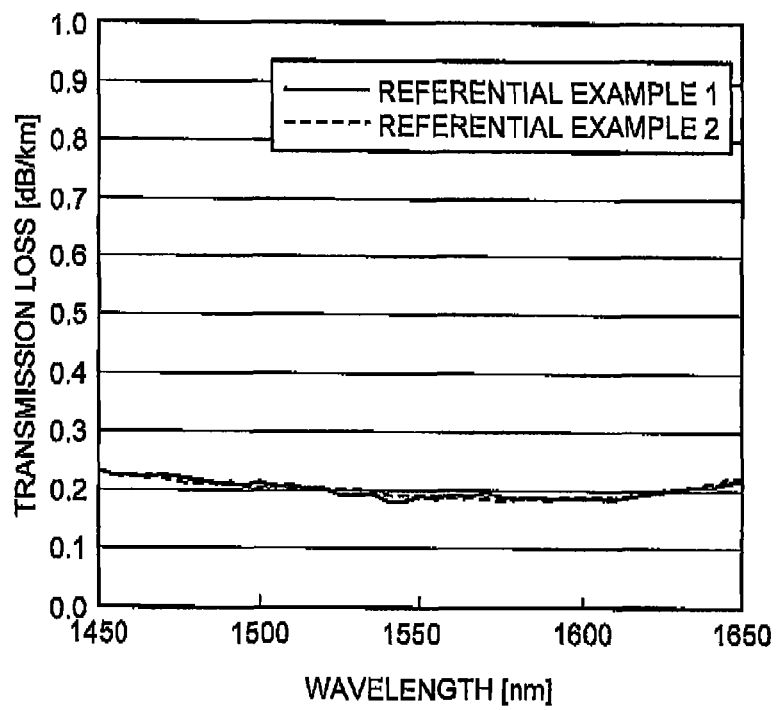
FIG. 25 is a graph of the transmission loss spectra of the single-core optical fibers of Referential examples 1 and 2.

Then, transmission loss spectra of Embodiment examples 1 to 4, Comparative example 1, and Referential examples 1 to 3 are depicted. FIGS. 23A to 23D show transmission loss spectra of the multi-core optical fibers of Embodiment examples 1 to 4, respectively. FIG. 24 shows transmission loss spectrum of the multi-core optical fiber of Comparative example 1. FIG. 25 shows transmission loss spectra of the single-core optical fibers of Referential examples 1 and 2. The letters "A" to "G" in the legends of FIGS. 23A to 23D and 24 indicate the core portions.

As illustrated in FIGS. 23A to 23D, the multi-core optical fibers of Embodiment examples 1 to 4 achieve the transmission losses equal to or less than 1 dB/km at the wavelength of 1550 nm (1.55 µm). Especially, Embodiment examples 1 and 2 achieve the transmission loss as low as the single-core optical fibers of Referential examples 1 and 2 and the transmission loss of the step-index-profile multi-core optical fiber of Comparative example 1 as illustrated in FIGS. 24 and 25.

Figure 26:
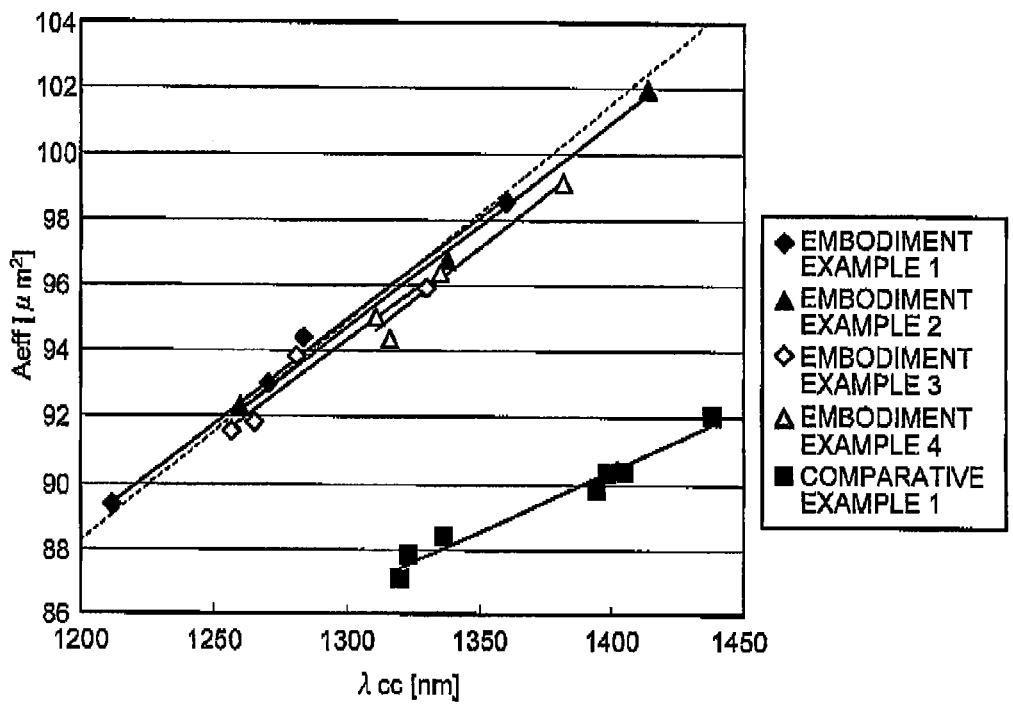
FIG. 26 is a graph that depicts the relation between $\lambda_{cc}$ and Aeff of each core portion of the multi-core optical fibers of Embodiment examples 1 to 4 and Comparative example 1.

Then, the effective core areas, the bending losses, and the transmission losses of the multi-core optical fibers of Embodiment examples 1 to 4 and Comparative example 1 will be explained more specifically. FIG. 26 is a graph that depicts the relation between the cable cut-off wavelength ($\lambda_{cc}$) and Aeff of each core portion of the multi-core optical fibers of Embodiment examples 1 to 4 and Comparative example 1. The data points in the graph correspond to the core portions A, B, D, and G of Embodiment example 1, the core portions A, B, and G of Embodiment example 2, the core portions A, E, F, and G of Embodiment example 3, the core portions A, C, E, F, and G of Embodiment example 4, and the core portions A to G of Comparative example 1. The solid lines in the graph are linear approximation curves depicted using the data points of Embodiment examples 1 to 4 and Comparative example 1, respectively. The dotted line depicts the relation between $\lambda_{cc}$ and Aeff that is calculated from the design parameters of FIG. 17.

As illustrated in FIG. 26, the relation between $\lambda_{cc}$ and Aeff of each core portion of the multi-core optical fibers of Embodiment examples 1 to 4 is almost identical with the relation that is calculated from the design parameters illustrated in FIG. 17. Through comparison of Embodiment examples 1 to 4 with Comparative example 1, it is found that, when $\lambda_{cc}$ is the same value, Aeff of Embodiment examples 1 to 4 is greater than Aeff of Comparative example 1 by about 8 µm².

Figure 27:
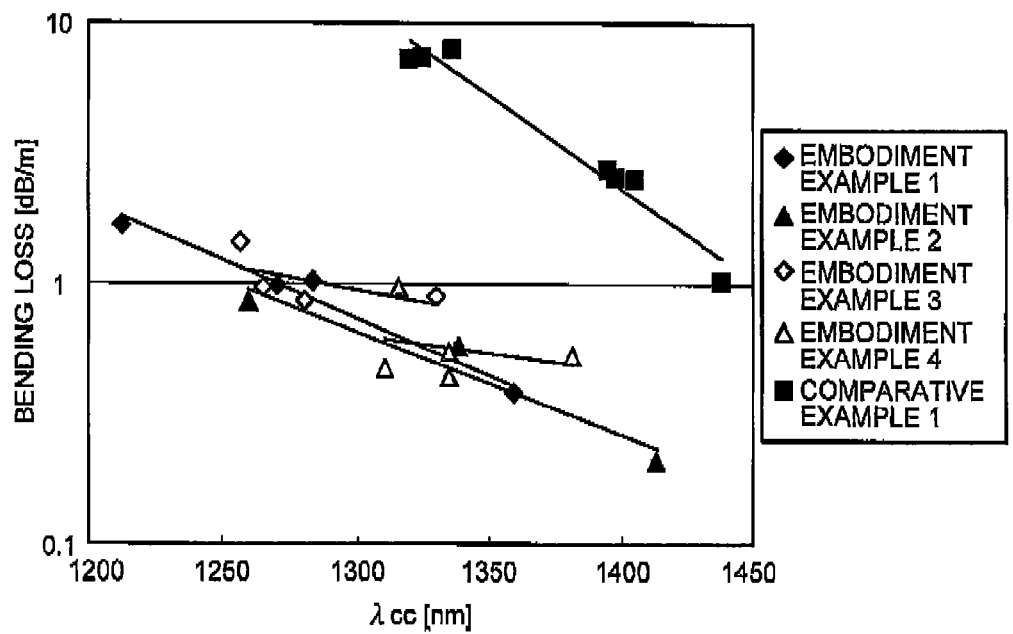
FIG. 27 is a graph that depicts the relation between $\lambda_{cc}$ and the bending loss of each core portion of the multi-core optical fibers of Embodiment examples 1 to 4 and Comparative example 1.

FIG. 27 is a graph that depicts the relation between the cable cut-off wavelength ($\lambda_{cc}$) and the bending loss of each core portion of the multi-core optical fibers of Embodiment examples 1 to 4 and Comparative example 1. Similar to FIG. 26, the data points in the graph correspond to the core portions A, B, D, and G of Embodiment example 1, the core portions A, B, and G of Embodiment example 2, the core portions A, E, F, and G of Embodiment example 3, the core portions A, C, E, F, and G of Embodiment example 4, and the core portions A to G of Comparative example 1. The solid lines in the graph are linear approximation curves depicted using the data points of Embodiment examples 1 to 4 and Comparative example 1, respectively.

As illustrated in FIG. 27, through comparison of Embodiment examples 1 to 4 with Comparative example 1, it is found that, if $\lambda_{cc}$ is the same value, the bending losses of Embodiment examples 1 to 4 axe about ⅒ of the bending loss of Comparative example 1.

Figure 28:
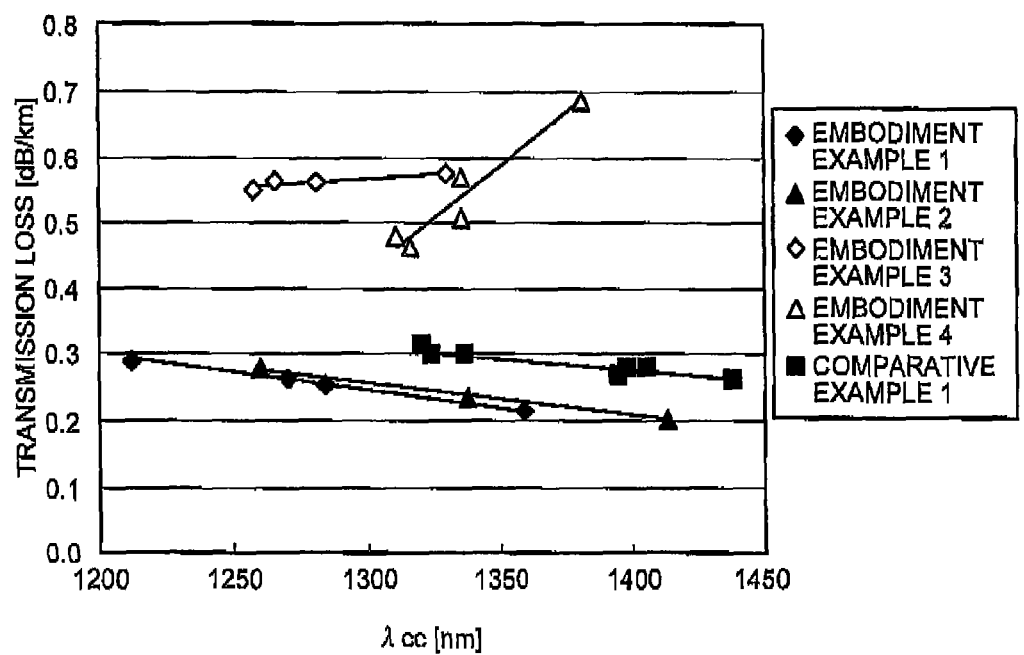
FIG. 28 is a graph that depicts the relation between $\lambda_{cc}$ and the transmission loss of each core portion of the multi-core optical fibers of Embodiment examples 1 to 4 and Comparative example 1.

FIG. 28 is a graph that depicts the relation between the cable cut-off wavelength ($\lambda_{cc}$) and the transmission loss of each core portion of the multi-core optical fibers of Embodiment examples 1 to 4 and Comparative example 1. Similar to FIG. 26, the data points in the graph correspond to the core portions A, B, D, and G of Embodiment example 1, the core portions A, B, and G of Embodiment example 2, the core portions A, E, F, and G of Embodiment example 3, the core portions A, C, E, F, and G of Embodiment example 4, and the core portions A to G of Comparative example 1. The solid lines in the graph are linear approximation curves depicted using the data points of Embodiment examples 1 to 4 and Comparative example 1, respectively.

As illustrated in FIG. 28, the trend is found in Embodiment examples 1 and 2 and Comparative example 1 that, regardless of the position of the core portion, as $\lambda_{cc}$ increases, the transmission loss decreases. In contrast, the trend is found in Embodiment examples 3 and 4 that, regardless of the position of the core portion, as $\lambda_{cc}$ decreases, the transmission loss decreases. Possible reasons for abovementioned dependency of the transmission loss on the cable cut-off wavelength are macrobending, microbending (bending loss), cross-talk, etc.

Figure 29:
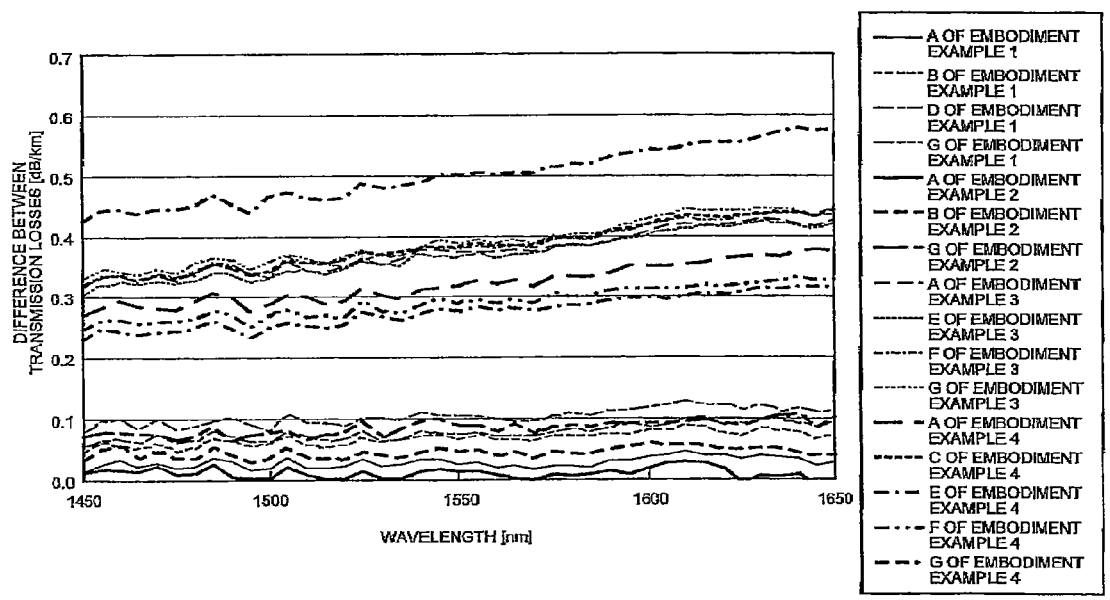
FIG. 29 is a graph of difference spectra that are the differences between the transmission loss spectrum of each core portion of the multi-core optical fibers of Embodiment examples 1 to 4 and the transmission loss spectrum of the single-core optical fiber of Comparative example 1.

The difference is calculated between the transmission loss spectrum of each core portion of the multi-core optical fibers of Embodiment examples 1 to 4 and the transmission loss spectrum of the single-core optical fiber of Comparative example 1 in which the cable cut-off wavelength is about 1260 nm. FIG. 29 is a graph of difference spectra that are the differences between the transmission loss spectrum of each core portion of the multi-core optical fibers of Embodiment examples 1 to 4 and the transmission loss spectrum of the single-core optical fiber of Comparative example 1. As illustrated in FIG. 29, it is found that each difference spectrum shows linear wavelength dependency. Since the bending loss and the microbending loss increase depending on the wavelength in an exponential manner, it is highly possible the trends of the multi-core optical fibers illustrated in FIG. 28 that as $\lambda_{cc}$ increases, the transmission loss decreases or as $\lambda_{cc}$ decreases, the transmission loss decreases are caused by interference of light between core portions.

Figure 30:
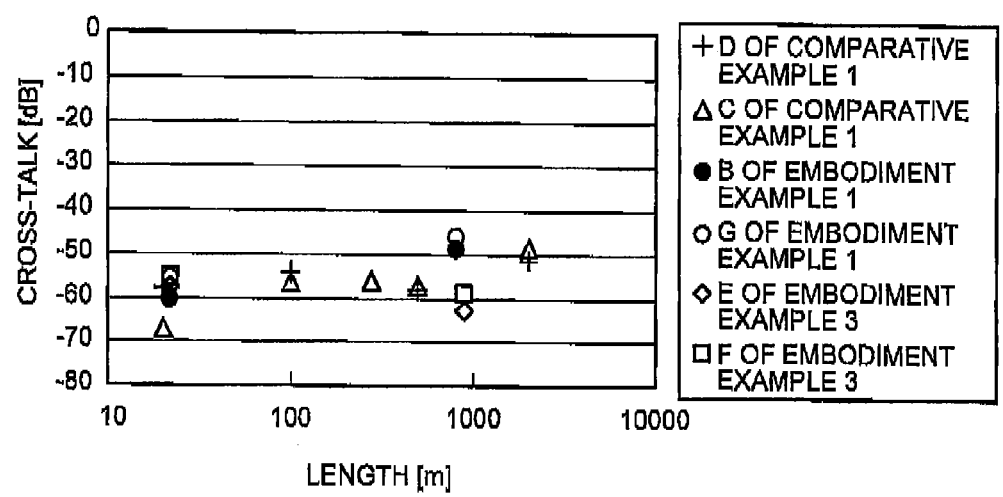
FIG. 30 is a graph that depicts the dependency of the cross-talk at the wavelength of 1.55 µm on the length of the multi-core optical fiber according to Embodiment examples 1 and 3, and Comparative example 1.

FIG. 30 is a graph that depicts the dependency of the cross-talk at the wavelength of 1.55 µm on the length of the multi-core optical fiber according to Embodiment examples 1 and 3, and Comparative example 1. In FIG. 30, for example, "B of Embodiment example 1" indicates the cross-talk between the core portion A and the core portion B in the multi-core optical fiber according to Embodiment example 1 when light enters the core portion A positioned at the center of the optical fiber. As illustrated in FIG. 30, any data indicates that the optical cross-talk at the wavelength of 1.55 µm between core portions is equal to or less than −45 dB and the cross-talk of an optical signal individually transmitting through each core portion is sufficiently low.

(Design for Large Aeff)

Design for large Aeff over 135 µm² while keeping cable cutoff-wavelength $\lambda_{cc}$ below 1530 nm for a multi-core optical fiber according to the first embodiment is then disclosed. FIG. 31 is a table of designed optical properties at the wavelength of 1550 nm. In the design, Δ1, Δ2, and Δ3 are set to 0.17%, 0%, and −0.4%, respectively to realize the designed optical properties shown in FIG. 31. 2A, 2B, and 2C are set to 12.7 µm, 25.8 µm, and 40.8 µm, respectively, that is, Ra2, Ra3, and (Ra3−Ra2) are 2.0, 3.2, and 1.2 respectively.

Next, the optimum interval distance between the cores portions required for the realization of the target crosstalk, namely, −40 dB after 100 km transmission is disclosed. FIG. 32 is a graph that depicts the calculated relation between interval distance between the cores and crosstalk after 100 km transmission at the wavelength of 1550 nm or 1625 nm. The coupled-mode theory with the equivalent refractive index model considering the effect of bending is used for the simulation of crosstalk. The sum of crosstalk for the center core portion received from 6 outer core portions is considered. As shown in the FIG. 32, the crosstalk after 100 km transmission can be suppressed below −40 dB at λ=1625 nm when the interval distance is larger than 53 µm. The crosstalk at λ=1550 nm is lower than that of λ=1625 nm. As a result, it is revealed that crosstalk less than −40 dB is obtained over whole C+L band when the interval distance is larger than 53 µm.

It is pointed out in K. Takenaga et al., "A Large Effective Area Multi-Core Fibre with an Optimised Cladding Thickness," ECOC2011, Mo.1.LeCervin.2 (2011)., that the cable cut-off wavelength of the center core portion tends to be shifted to the longer wavelength compared to the outer core portions in case of 7-core optical fiber with trench index profile. This phenomenon is reported to be caused by additional confinement of higher order modes by the trench layer of outer core portions. The design optimization taking this point of view into account is important because it is expected that the longer shift of cable cut-off wavelength may be easily occurred especially in case of large Aeff multi core optical fiber.

FIG. 33 is a graph that depicts the simulated relation between interval distance between the cores and cable cut-off wavelength for the center core portion and outer core portions. As shown in FIG. 33, the interval distance larger than 55 µm is preferable to avoid remarkable shift of the cable cut-off wavelength of center core portion. Because the design with the interval distance of 55 µm satisfies the condition for the crosstalk, the interval distance is set to 55 µm in the design.

The design optimization in terms of excess loss of the outer core portions is then disclosed. The excess loss is one of the most important design factors in case of large Aeff multi core optical fiber because an excess loss tends to be increased when the Aeff become large. FIG. 34 is a graph that depicts the relation between outside diameter of the cladding portion and excess loss of outer core portions at the wavelength of 1550 nm. In each case, the interval distance between the cores is set to 55 µm, which is found to be the optimum value for the crosstalk and cable cut-off wavelength characteristics. As a result, the excess loss at $\lambda=1550$ nm can be suppressed less than 0.001 dB/km when the outside diameter is enlarged over 188 µm. From these points of views of design optimization, we set the target parameters of the large Aeff multi core optical fiber as the interval distance between the cores of 55 µm and the outside diameter of the cladding portion of 188 µm.

Figures 37, 38, 39:
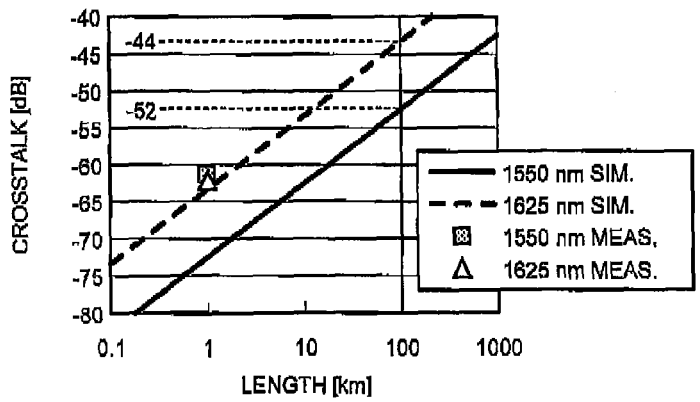
FIG. 37 is a table of measurement results of characteristics of each core portion of the multi-core optical fibers of Embodiment example 5A.
FIG. 38 is a graph that depicts the relation between length of the multi-core optical fiber and simulated or measured crosstalk.
FIG. 39 is a table of structural parameters of the multi-core optical fiber of Embodiment example 5B.

Embodiment example 5A of the present invention is then manufactured according to the above optimized design for large Aeff. FIG. 35 is a cross-sectional view of the multi-core optical fiber of Embodiment example 5A. FIG. 36 is a table of structural parameters of the multi-core optical fiber of Embodiment example 5A. FIG. 37 is a table of measurement results of characteristics of each core portion of the multi-core optical fibers of Embodiment example 5A. In FIG. 37, ID number 1 indicates the center core portion, and ID numbers 2 to 6 indicate the outer core portions.

Almost the same optical characteristics as the design are confirmed. The large Aeff over 135 µm² is obtained in average, which is the largest Aeff as for the multi core fibers so far to the best of our knowledge. This large Aeff will contribute to the suppression of nonlinearity in the transmission line. The cable cut-off wavelength is less than 1500 nm in each core portions, so the single mode transmission is assured in the whole C+L band. The average transmission loss is 0.224 dB/km at 1550 nm. The bending loss as low as 0.2 dB/m was confirmed in spite of such a large Aeff. Though the micro bending loss properties are not measured for this fiber, it is expected that the micro bending loss is adequately low because there is not any remarkable degradation in OTDR (Optical Time Domain Reflectometer) waveform measured with the OTDR measurement equipment for each core portions.

FIG. 38 is a graph that depicts the relation between length of the multi-core Optical fiber and simulated or measured crosstalk at the wavelength of 1500 nm or 1625 nm. "Meas." means the measured average crosstalk between neighboring core portions. "Sim." means the simulated crosstalk between neighboring core portions. The measured average crosstalk is about −70 dB after 1 km transmission for $\lambda=1550$ nm and 1625 nm at the bending diameter of R=140 mm. The sum of crosstalk from all neighboring core portions in terms of center core portion is about −62 dB for each wavelength. The simulated crosstalk at $\lambda=1550$ nm is lower than that of $\lambda=1625$ nm by about 8 dB, however, the measured crosstalk at $\lambda=1550$ nm is almost the same as that of $\lambda=1625$ nm. This discrepancy between measured and simulated results may be caused by the lower measurement limit of the measurement system of crosstalk which is used (~−70 dB). From the simulation result, it is expected that the crosstalk after 100 km transmission should be about −52 dB and −44 dB at $\lambda=1550$ nm and 1625 nm, respectively.

Design for large Aeff over 115 µm² according to the first embodiment is then disclosed. In Embodiment Examples 5B, the fiber design are optimized to realize Aeff over 115 µm², cable cutoff-wavelength $\lambda_{cc}$ below 1530 nm, and excess loss of the outermost core portions below 0.001 dB/km at $\lambda=1550$ nm. In the design, Δ1, Δ2, and Δ3 are set to 0.26%, 0%, and −0.7%, respectively. 2A, 2B, and 2C are set to 12.0 µm, 24.0 µm, and 31.2 µm, respectively, that is, Ra2, Ra3, and (Ra3−Ra2) are 2.0, 2.6, and 0.6 respectively. Interval distance, outside diameter of the cladding portion, and outside diameter of the coating portion are set to 56 µm, 196 µm, and 345 µm, respectively.

Figures 40, 41, 42:
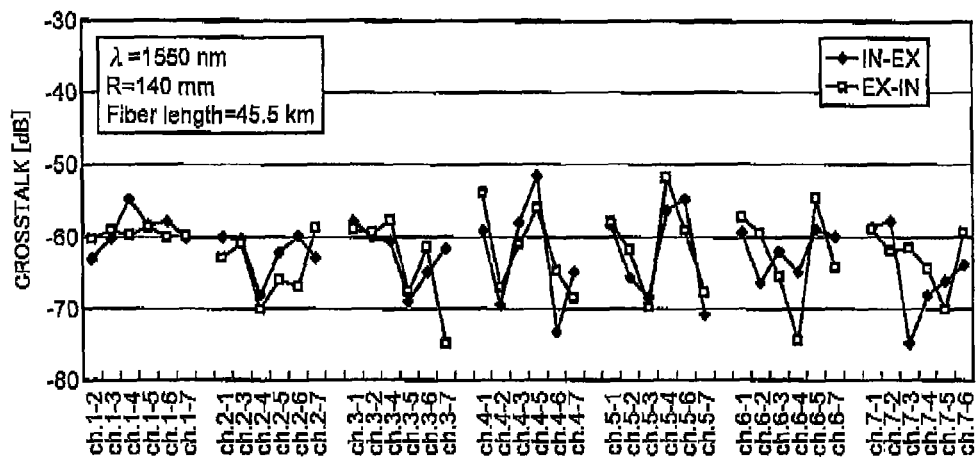
FIG. 40 is a table of measurement results of characteristics of each core portion of the multi-core optical fibers of Embodiment example 5B.
FIG. 41 is a graph that depicts crosstalk into other core portions.
FIG. 42 is a table of total span loss.

Embodiment example 5B of the present invention is then manufactured according to the above optimized design for large Aeff. In terms of the multi-core optical fiber of Embodiment example 5B, a cross-sectional view similar to that shown in FIG. 35 is obtained. FIG. 39 is a table of structural parameters of the multi-core optical fiber of Embodiment example 5B. FIG. 40 is a table of measurement results of characteristics of each core portion of the multi-core optical fibers of Embodiment example 5B. In FIG. 40, ID number 1 indicates the center core portion, and ID numbers 2 to 6 indicate the outer core portions. In FIG. 40, all the characteristics other than the cable cut-off wavelength $\lambda_{cc}$ are values at the wavelength of 1550 nm.

Almost the same optical characteristics as the design are confirmed. This large Aeff will contribute to the suppression of nonlinearity in the transmission line. The attenuation losses below 0.200 dB/km (average 0.198 dB/km) at $\lambda=1550$ nm are obtained. Aeff of the multi-core optical fiber of Embodiment Example 5B is about 120 µm² for all core portions. The cable cut-off wavelength is less than 1500 nm in each core portions, so the single mode transmission is assured in the whole C+L band. The bending loss as low as 0.5 dB/m at the bending radius of 10 mm was confirmed in spite of such a large Aeff.

The crosstalk between each other core portions in the multi-core optical fiber of Embodiment Example 5B is measured for all core portions. FIG. 41 is a graph that depicts crosstalk into other core portions. The crosstalk was measured in the condition that the multi-core optical fiber was connected with fan-in and fan-out device. Here, fan-in device was used to combine the single-core optical signals into the multi-core signal. On the other hand, the fan-out device was used to divide the multi-core optical signal into single-core signals. It is confirmed that the crosstalk between neighboring cores was less than −50 dB at $\lambda=1550$ nm and bending radius R=140 mm after 45.5 km transmission including the crosstalk occurred in the fan-in and fan-out device. The total span losses including 45.5 km of the multi-core fiber and fan-in and fan-out devices are less than 10.5 dB at $\lambda=1550$ nm as shown in FIG. 42.

Embodiment Examples 6 and 7

A multi-core optical fiber of Embodiment Examples 6 and 7 according to the present invention is then manufactured. The multi-core optical fiber of Embodiment Examples 6 and 7 have 19 core portions.

The biggest issue in terms of increasing the core numbers from 7 to 19 is the increase of outside diameter of the cladding portion. In particular, a design optimization of an interval distance between each of the core portions is the most important because the outside diameter of the cladding portion diameter is directly increased as the interval distance increases. In Embodiment Examples 6 and 7, the fiber design are optimized to realize Aeff over 70 µm² and excess loss of the outermost core portions below 0.001 dB/km at $\lambda=1550$ nm.

Two kinds of the fiber design are considered. In design 1 for Embodiment Example 6, Δ1, Δ2, and Δ3 are set to 0.4%, 0%, and −0.3%, respectively. 2A, 2B, and 2C are set to 7.4 µm, 13.9 µm, and 27.5 µm, respectively, that is, Ra2, Ra3, and (Ra3−Ra2) are 1.9, 3.7, and 1.8 respectively. Interval distance, outside diameter of the cladding portion, and outside diameter of the coating portion are set to 35 μm, 200 μm, and 345 μm, respectively.

In design 2 for Embodiment Example 7, Δ1, Δ2, and Δ3 are set to 0.4%, 0%, and −0.3%, respectively, 2A, 2B, and 2C are set to 7.8 μm, 14.5 μm, and 28.8 μm, respectively, that is, Ra2, Ra3, and (Ra3−Ra2) are 1.9, 3.7, and 1.8 respectively. Interval distance, outside diameter of the cladding portion, and outside diameter of the coating portion are set to 37 μm, 210 μm, and 348 μm, respectively.

Figure 43:
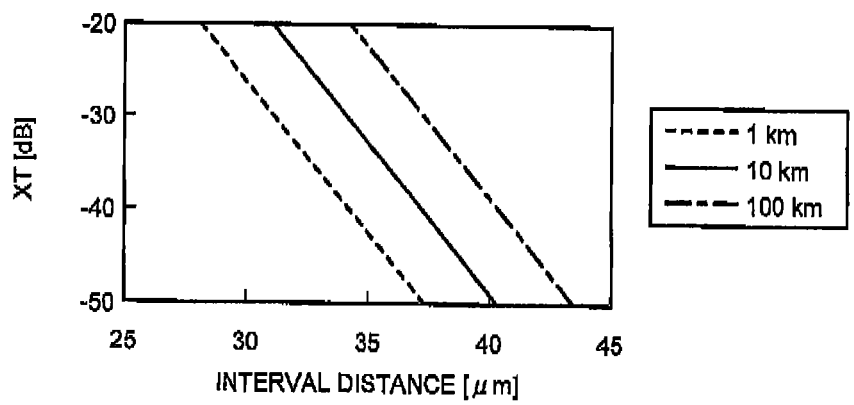
FIG. 43 is a graph that depicts the relation between Interval distance and simulated crosstalk (XT) for design 1 at the wavelength of 1550 nm.

FIG. 43 is a graph that depicts the relation between Interval distance and simulated crosstalk (XT) for design 1 at the wavelength of 1550 nm. It is confirmed that the multi-core optical fiber of Embodiment Example 6 having 19 core portions according to the design 1 with a outside diameter of the cladding portion of 200 μm (interval distance=35 μm and thickness of the cladding portion=30 μm) can suppress crosstalk from neighboring core portions below −30 dB, at λ=1550 nm after 10 km transmission, by optimizing the trench index profile.

Figure 44:
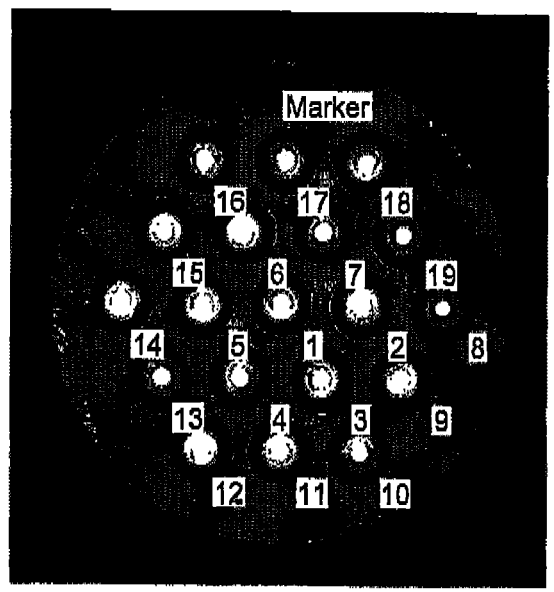
FIG. 44 is a cross-sectional view of the multi-core optical fiber of Embodiment Example 6.

Based on the above simulation results, the multi-core optical fiber of Embodiment Examples 6 and 7 are manufactured. FIG. 44 is a cross-sectional view of the multi-core optical fiber of Embodiment Example 6. The numbers in the figure are ID number of the core portions For easy identification, the core portions are classified into 3 groups, namely, a center core portion (core 1), inner core portions (cores 2 to 7), and outer core portions (cores 8 to 19).

Figure 46:
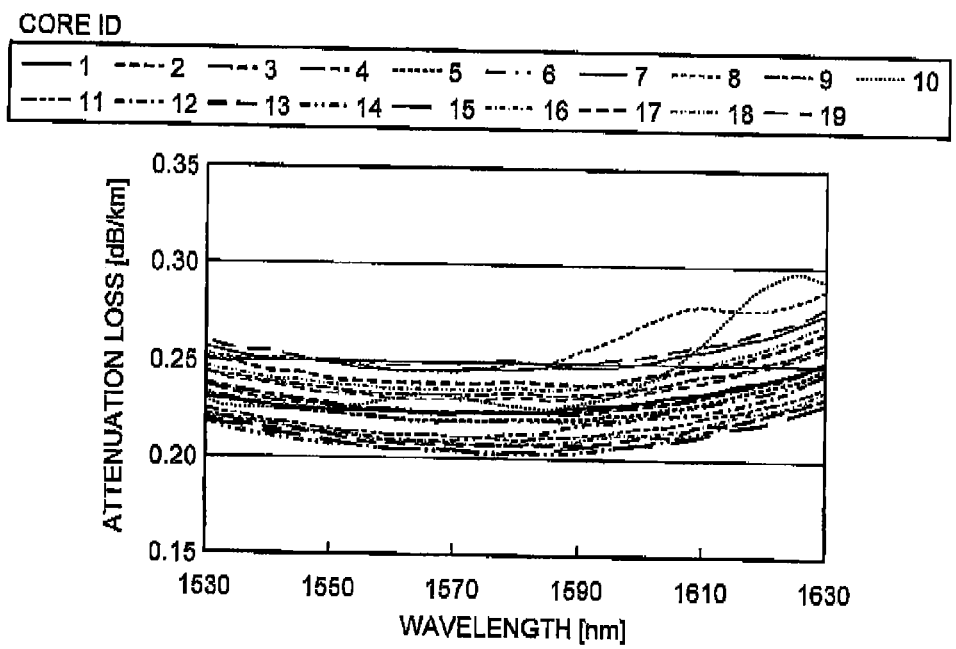
FIG. 46 is a graph that depicts attenuation loss spectra, of core portions in the multi-core optical fiber of Embodiment Example 6.

FIG. 45 is a table of the optical characteristics of all core portions in the multi-core optical fiber of Embodiment Example 6. The optical characteristics are the values at the wavelength of 1550 nm except for the cable cut-off wavelength. In FIG. 45, the average optical characteristics of each group are also shown. FIG. 46 is a graph that depicts attenuation loss spectra of core portions in the multi-core optical fiber of Embodiment Example 6.

The attenuation losses below 0.26 dB/km (average 0.23 dB/km) at λ=1550 nm are obtained. Aeff of the multi-core optical fiber of Embodiment Example 6 is about 72 μm² for all core portions. The cable cut-off wavelength (λcc) of the center core portion and the inner core portions are longer than those of the outer core portions, which is considered to be caused by the influence of trench layer of neighboring core portions (referred to K. Takenaga et al., "A Large Effective Area Multi-Core Fibre with an Optimised Cladding Thickness," ECOC2011, Mo.1.LeCervin.2 (2011).). However, the maximum value of λcc is 1528 nm, which is below 1530 nm, so the single mode transmission through C-L band can be expected for the multi-core optical fiber of Embodiment Example 6.

Figure 47:
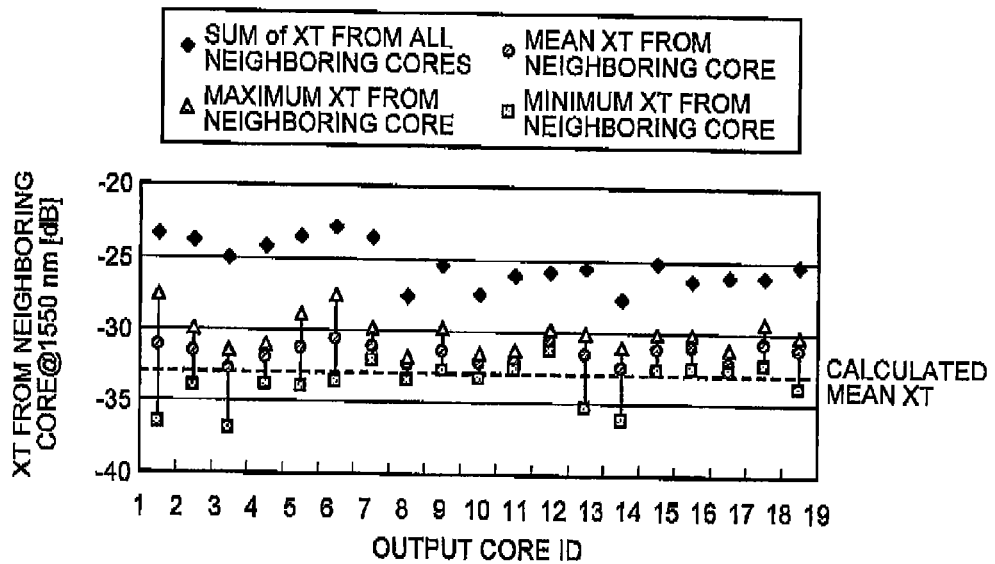
FIG. 47 is a graph that depicts each of the maximum, minimum, and mean crosstalk from a neighboring core portion and the sums of the crosstalk from all neighboring core portions.

The crosstalk from neighboring core portions in the multi-core optical fiber of Embodiment Example 6 is measured for all core portions. FIG. 47 is a graph that depicts each of the maximum, minimum, and mean crosstalk from a neighboring core portion and the sums of the crosstalk from all neighboring core portions. It is confirmed that the mean crosstalk from a neighboring core was −32 dB at λ=1550 nm and bending radius R=90 mm after 10.4 km transmission, which is well agreed with the simulation based on the coupled-mode theory with the equivalent index model.

Figure 48:
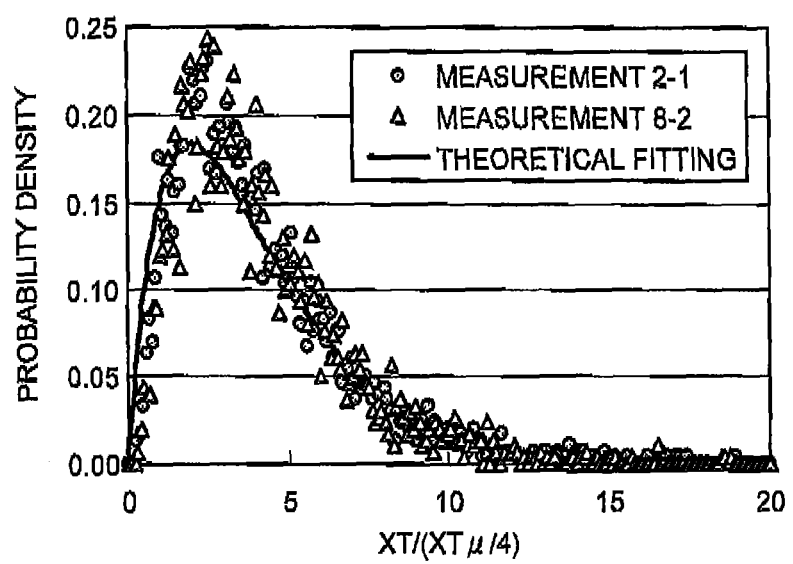
FIG. 48 is a graph that depicts the measured crosstalk distributions between core 2 and core 1 and between core 8 and core 2.

FIG. 48 is a graph that depicts the measured crosstalk distributions between core 2 and core 1 and between core 8 and core 2. As reported in T. Hayashi et al., "Design and fabrication of ultra-low crosstalk and low-loss multi-core fiber," Optics Express, v. 19, n. 17, p. 16576 (2011)., it is confirmed that the crosstalk distributions are fitted to the theoretical curve of chi-square distribution with four degrees of freedom.

Figure 50:
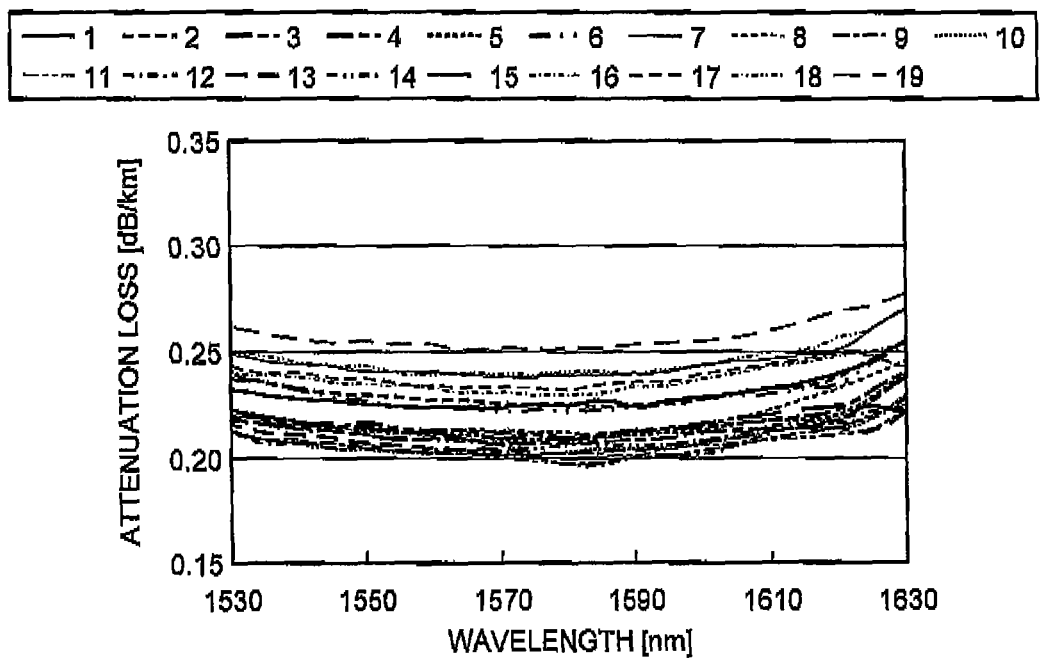
FIG. 50 is a graph that depicts attenuation loss spectra of core portions in the multi-core optical fiber of Embodiment Example 7.

FIG. 49 is a table of the optical characteristics of all core portions in the multi-core optical fiber of Embodiment Example 7. The optical characteristics are the values at the wavelength of 1550 nm except for the cable cut-off wavelength. In FIG. 49, the average optical characteristics of each group are also shown. FIG. 50 is a graph that depicts attenuation loss spectra of core portions in the multi-core optical fiber of Embodiment Example 7.

The attenuation losses below 0.26 dB/km (average 0.22 dB/km) at λ=1550 nm are obtained. Aeff of the multi-core optical fiber of Embodiment Example 7 is about 74 μm² for all core portions. The cable cut-off wavelength (λcc) of the center core portion and the inner core portions are longer than those of the outer core portions However, the maximum value of λcc is 1535 nm, so the single mode transmission almost through C-L band can be also expected for the multi-core optical fiber of Embodiment Example 7.

Figure 51:
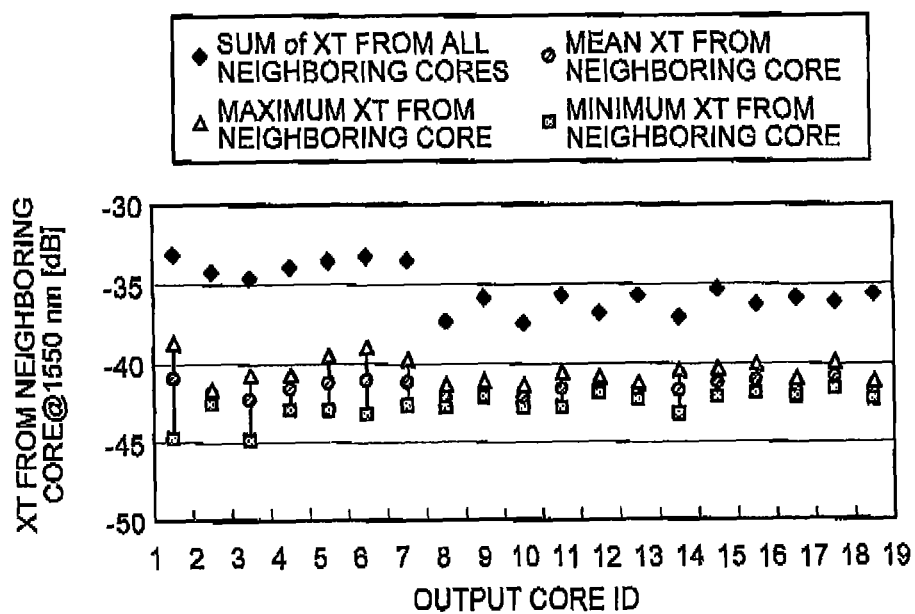
FIG. 51 is a graph that depicts each of the maximum, minimum, and mean crosstalk from a neighboring core portion and the sums of the crosstalk from all neighboring core portions.

The crosstalk from neighboring core portions in the multi-core optical fiber of Embodiment Example 7 is measured for all core portions. FIG. 51 is a graph that depicts each of the maximum, minimum, and mean crosstalk from a neighboring core portion and the sums of the crosstalk from all neighboring core portions. It is confirmed that the mean crosstalk from a neighboring core was −42 dB at λ=1550 nm and bending radius R=90 mm after 6.2 km transmission, which is well agreed with the simulation based on the coupled-mode theory with the equivalent index model.

To realize effective SDM (Space Division-Multiplexing) transmission, core density is the most important factor. The core density can be calculated taking the outside diameter of the cladding portion or the coating portion into account. FIG. 52 is a table of the number of core portions, outside diameter of cladding portion, and core density based on the outside diameter of the cladding portion. 7-core and 10-core are disclosed in, T. Hayashi et al., "Design and fabrication of ultra-low crosstalk and low-loss multi-core fiber," Optics Express, v. 19, n. 17, p. 16576 (2011)., S. Matsuo et al., "Large-effective-area ten-core fiber with cladding diameter of about 200 mm," Optics Letters, v. 36, n. 23, p, 4626 (2011)., respectively. The multi-core optical fiber of Embodiment Example 6 has 19 core portions in the 200 μm-outside diameter of cladding portion, so it can realize more than 7 times higher core density than the conventional single-core single-mode optical fibers with 125 μm cladding.

On the other hand, FIG. 53 is a table of the number of core portions, outside diameter of cladding portion, and core density based on the outside diameter of the coating portion. Based on the outside diameter of the coating portion, it can be said that about 10 times higher core density can be realized compared to the conventional optical fibers with 250 μm cladding for the multi-core optical fiber of Embodiment Example 6, which is suitable for large-scale SDM.

It is noted that the present invention is not limited to the above embodiments. Moreover, the present invention includes a modification that is configured by appropriately combining any constituent elements of the above embodiments. For example, the multi-core optical fiber according to the third embodiment can be configured to include, in the same manner as in the multi-core optical fiber according to the second embodiment, a non-identical core portion. The number of core portions can be any value so long as it is equal to or larger than two.

According to the above-described embodiments, it is possible to achieve a multi-core optical fiber that has core portions arranged more densely and to suppress cross-talk between the core portions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-core optical fiber comprising:
   a plurality of core portions; and
   a cladding portion positioned so as to surround an outside of each of the core portions,
   wherein
   each of the core portions includes a center core portion that is positioned at a center of that core portion and that has a refractive index which is greater than that of the cladding portion, a second core portion that is formed so as to surround an outside of the center core portion and that has a refractive index which is less than that of the center core portion, and a depressed portion that is formed so as to surround an outside of the second core portion and that has a refractive index which is less than those of the second core portion and the cladding portion,
   a relative refractive-index difference of the center core portion with respect to the cladding portion is $\Delta 1$, a relative refractive-index difference of the second core portion with respect to the cladding portion is $\Delta 2$, a relative refractive-index difference of the depressed portion with respect to the cladding portion is $\Delta 3$, a diameter of the center core portion is 2A, an outside diameter of the second pore portion is 2B, an outside diameter of the depressed portion is 2C, B/A is Ra2, and C/A is Ra3,
   $\Delta 1$ is from 0.05% to 1.2%, $\Delta 2$ is almost 0%, $\Delta 3$ is equal to or greater than $-0.7\%$, 2A is from 4 μm to 14 μm, Ra2 is 1 to 3, (Ra3−Ra2) is equal to or less than 2, a cut-off wavelength is from 1 μm to 1.53 μm, and an effective core area at a wavelength of 1.55 μm is from 30 μm² to 180 μm², and
   an interval distance between each of the core portions and another one of the core portions positioned adjacent thereto is set such that optical cross-talk between the core portions for a total length of the multi-core optical fiber is equal to or less than −30 dB at a wavelength of 1.55 μm.

2. The multi-core optical fiber according to claim 1, wherein
   the total length is equal to or greater than 100 km;
   all the core portions have the same $\Delta 1$, the same $\Delta 3$, the same 2A, the same Ra2, and the same Ra3; and
   the interval distance between the adjacent core portions is equal to or greater than 40 μm.

3. The multi-core optical fiber according to claim 1, wherein
   the total length is equal to or greater than 100 km;
   the core portions include two or more core portions that have the same $\Delta 1$, the same $\Delta 3$, the same 2A, the same Ra2, and the same Ra3, and at least one non-identical core portion in which at least one of $\Delta 1$, $\Delta 3$, and 2A is different from that of the two or more core portions;
   the interval distance between the two or more core portions is equal to or greater than 40 μm; and
   the interval distance between the non-identical core portion and another core portion adjacent to the non-identical core portion is less than the interval distance between the two or more core portions.

4. The multi-core optical fiber according to claim 1, wherein
   a shortest distance between a center of one of the core portions that is closest to an outer circumference of the cladding portion and the outer circumference of the cladding portion is equal to or greater than 20 μm.

5. The multi-core optical fiber according to claim 1, wherein
   a bending loss caused by winding around a diameter of 20 mm at a wavelength of 1.55 μm is less than a bending loss of another multi-core optical fiber that has a step-index refractive index profile and has the same cut-off wavelength and the same effective core area as those of the multi-core optical fiber.

6. The multi-core optical fiber according to claim 1, wherein
   a bending loss caused by winding around a diameter of 20 mm at a wavelength of 1.55 μm is equal to or less than 1/5 of a bending loss of another multi-core optical fiber that has a step-index refractive index profile and has the same cut-off wavelength and the same effective core area as those of the multi-core optical fiber.

7. A method of manufacturing the multi-core optical fiber according to claim 1, the method comprising:
   arranging capillaries inside a glass member that is used to form the cladding portion, thereby forming an optical fiber preform, each of the capillaries having a core area that is used to form each of the center core portion and the second core portion, and a depressed area that is used to form the depressed portion; and
   drawing the optical fiber from the optical fiber preform.

* * * * *